US011687158B2

(12) United States Patent
Seo

(10) Patent No.: US 11,687,158 B2
(45) Date of Patent: Jun. 27, 2023

(54) IMAGING APPARATUS INCLUDING A VIBRATION DEVICE TO PROVIDE TOUCH SENSE TO THE USER BASED ON IMAGING MODE

(71) Applicant: CANON KABUSHIKI KAISHA, Tokyo (JP)

(72) Inventor: Takazumi Seo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/180,482

(22) Filed: Feb. 19, 2021

(65) Prior Publication Data

US 2021/0271325 A1 Sep. 2, 2021

(30) Foreign Application Priority Data

Feb. 27, 2020 (JP) ................................ 2020-032453

(51) Int. Cl.

| | |
|---|---|
| ***G06F 3/01*** | (2006.01) |
| ***H04N 23/51*** | (2023.01) |
| ***H04N 23/63*** | (2023.01) |
| ***H04N 23/73*** | (2023.01) |
| ***H04N 23/959*** | (2023.01) |

(52) U.S. Cl.

CPC ............ *G06F 3/016* (2013.01); *H04N 23/51* (2023.01); *H04N 23/631* (2023.01); *H04N 23/73* (2023.01); *H04N 23/959* (2023.01)

(58) Field of Classification Search

CPC .................. G06F 3/016; H04N 5/2252; H04N 5/232125; H04N 5/232933; H04N 5/2353

See application file for complete search history.

(56) References Cited

U.S. PATENT DOCUMENTS

| | | | | |
|---|---|---|---|---|
| 2013/0265268 A1* | 10/2013 | Okumura | ............ | G06F 3/04847 345/173 |
| 2014/0104453 A1* | 4/2014 | Fujinawa | ........... | H04N 5/23212 348/222.1 |
| 2020/0322517 A1* | 10/2020 | Tani | ..................... | H04N 5/2328 |

FOREIGN PATENT DOCUMENTS

| | | |
|---|---|---|
| JP | 2006136865 A | 6/2006 |

* cited by examiner

*Primary Examiner* — Ahmed A Berhan

(74) *Attorney, Agent, or Firm* — Canon U.S.A., Inc. I.P. Division

(57) ABSTRACT

There is provided an imaging apparatus having a plurality of switchable imaging modes and including a vibration control unit which changes vibration parameters of a vibration device based on the imaging mode and a user operation on an imaging start operation unit during an imaging recording period. The vibration device vibrates the imaging apparatus to transfer a touch sense to the user corresponding to the user operation on the imaging start operation unit.

7 Claims, 15 Drawing Sheets

FIG.7A

| MODE | OPERATED MEMBER | SILENT MODE | SHUTTER SYSTEM | CONSECUTIVE IMAGING SETTING | VIBRATION PATTERN MANAGEMENT TABLE |
|---|---|---|---|---|---|
| MECHANICAL SHUTTER MODE | IMAGING INPUT UNIT (RELEASE BUTTON) | OFF | MECHANICAL | — | — |
| ELECTRONIC SHUTTER MODE | | OFF | ELECTRONIC | OFF | T1 |
| | | | | ON | T2 |
| ELECTRONIC SHUTTER SILENT MODE | | ON | ELECTRONIC | OFF | T3 |
| | | | | ON | T4 |

FIG.7B

| | CONSECUTIVE IMAGING SETTING | OFF | ON |
|---|---|---|---|
| | VIBRATION PATTERN MANAGEMENT TABLE | T1 | T2 |
| SHUTTER SPEED | ⋮ | ⋮ | ⋮ |
| | 1” | T1 - 10 | T1 - 10 |
| | 0”5 | T1 - 11 | T1 - 11 |
| | ⋮ | ⋮ | ⋮ |
| | 1/15 | T1 - 14 | T2 - 14 |
| | 1/30 | T1 - 15 | T2 - 15 |
| | ⋮ | ⋮ | ⋮ |

FIG.7C

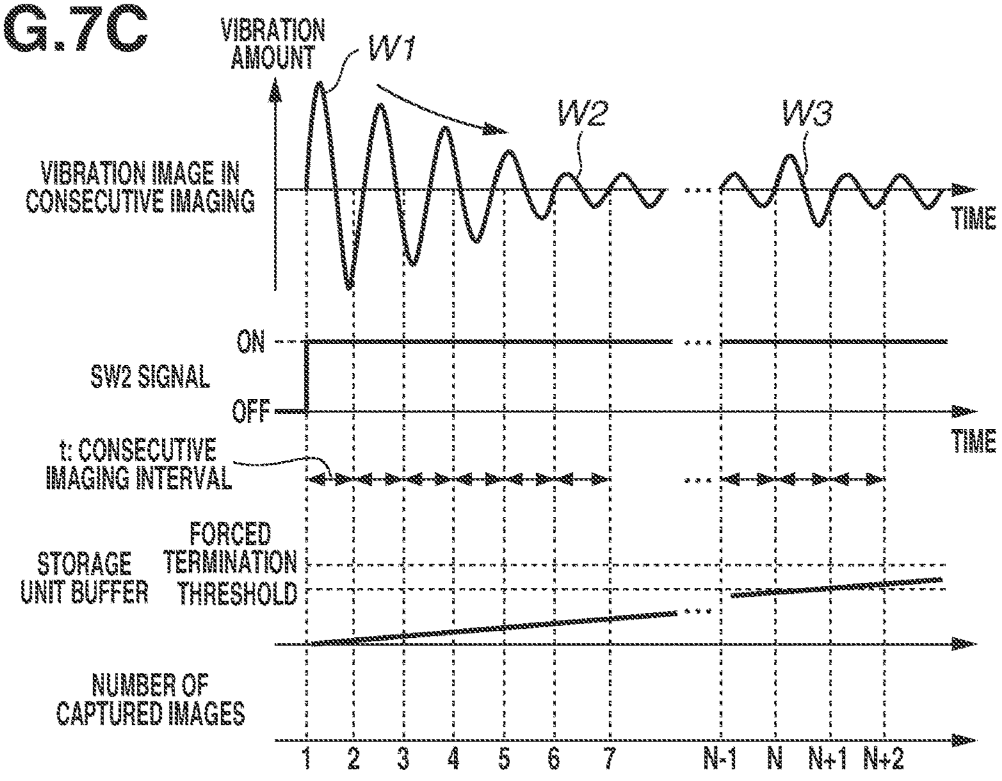

IMAGING APPARATUS INCLUDING A VIBRATION DEVICE TO PROVIDE TOUCH SENSE TO THE USER BASED ON IMAGING MODE

BACKGROUND

Field of the Disclosure

The present disclosure relates to an imaging apparatus such as a digital camera including a vibration device.

Description of the Related Art

In recent years, demands to perform imaging under quiet environments sensitive to noise, such as a museum has been increased.

An imaging apparatus commonly has a mechanical shutter system (hereinafter, referred to as a mechanical shutter) that controls a shutter mechanism to perform imaging. Accordingly, vibration and sound occur by operation of the mechanical shutter when a user performs imaging.

A mechanical shutter gives an imaging operation-feeling but imaging under the quiet environment is difficult to perform.

Thus, in recent years, an imaging apparatus including, in addition to the mechanical shutter, an electronic shutter system (hereinafter, referred to as electronic shutter) that electronically controls an imaging device to perform imaging has become more common.

In the case of the electronic shutter, the mechanism of the mechanical shutter does not operate and the imaging is accordingly performable with no sound, but the user cannot obtain the imaging operation-feeling obtainable from the mechanical shutter.

Japanese Patent Application Laid-Open No. 2006-136865 discusses a configuration in which, when a user performs input operation, a plurality of vibration devices disposed in an imaging apparatus is driven to transmit imaging operation-feeling to the user.

However, in the configuration discussed in Japanese Patent Application Laid-Open No. 2006-136865, the plurality of vibration devices is simultaneously driven to generate large vibration in order to give the imaging operation-feeling obtainable from the mechanical shutter.

Thus, under the quiet environment, driving sound of the vibration devices may become noise. Further, most of the imaging apparatuses include both of the mechanical shutter and the electronic shutter.

Thus, if vibration control of the vibration devices depending on the shutter system selected by the user is not performed, the vibration devices are driven at operation of a release button even in a case where the user selects the mechanical shutter and the imaging operation-feeling by the vibration devices is unnecessary.

As a result, addition of the vibration by the vibration devices to the vibration generated by the operation of the mechanical shutter may give discomfort operation-feeling to the user.

Further, the imaging apparatus can perform high-speed imaging that consecutively captures several tens of images per second, by using the electronic shutter.

Thus, when the imaging operation-feeling the same as that in single imaging is given to the user, a vibration interval by the vibration devices is delayed from an imaging interval of the consecutive imaging, which may be uncomfortable to the user.

SUMMARY

According to an aspect of the present disclosure, an imaging apparatus having a plurality of switchable imaging modes, includes an imaging start operation unit configured to instruct exposure start and exposure end of imaging, a vibration device configured to vibrate the imaging apparatus to transfer a touch sense to a user corresponding to the user operation on the imaging start operation unit, and a vibration control unit including a plurality of vibration patterns for controlling driving of the vibration device, wherein the vibration control unit changes vibration parameters of the vibration device based on the imaging mode and the user operation on the imaging start operation unit during imaging recording period.

Further features of the present disclosure will become apparent from the following description of exemplary embodiments with reference to the attached drawings.

BRIEF DESCRIPTION OF THE DRAWINGS

FIGS. 7A, 7B, and 7C are diagrams illustrating a vibration pattern management table according to the exemplary embodiment of the present disclosure.

DESCRIPTION OF THE EMBODIMENTS

<Example of Imaging Apparatus>

An example of an imaging apparatus according to an exemplary embodiment of the present disclosure is described below with reference to FIG. 1A to FIG. 6.

Figure 1A:
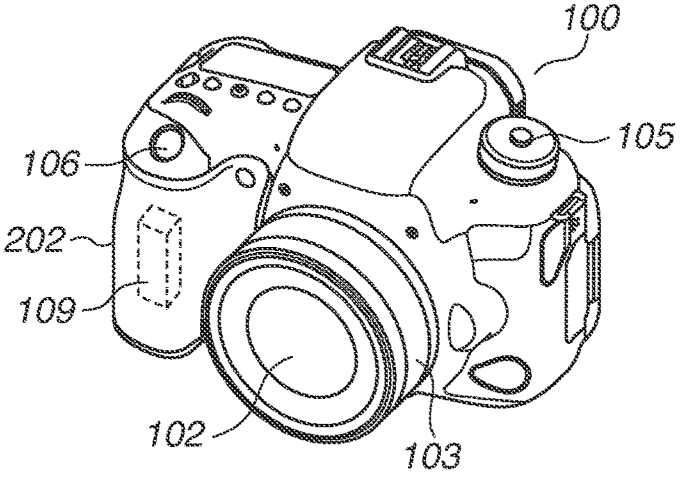
FIGS. 1A, 1B, 1C, and 1D are respectively a perspective view illustrating a front side of a camera, a perspective view illustrating a rear side of the camera, an exploded perspective view illustrating attachment of an interchangeable lens to a camera main body, and a diagram illustrating an internal configuration of a vibration device, according to an exemplary embodiment of the present disclosure.
Figure 1B:
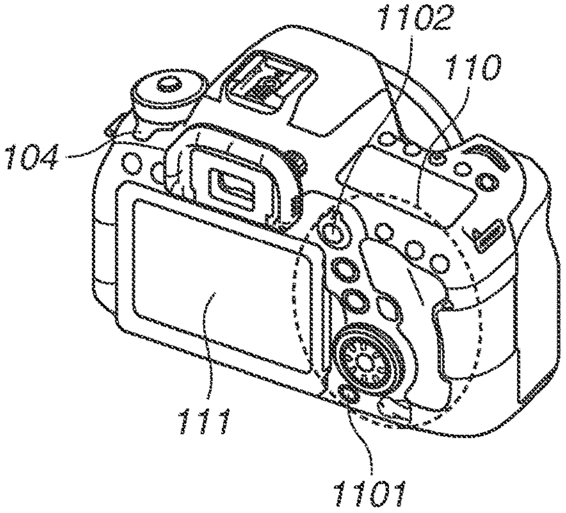
Figure 1C:
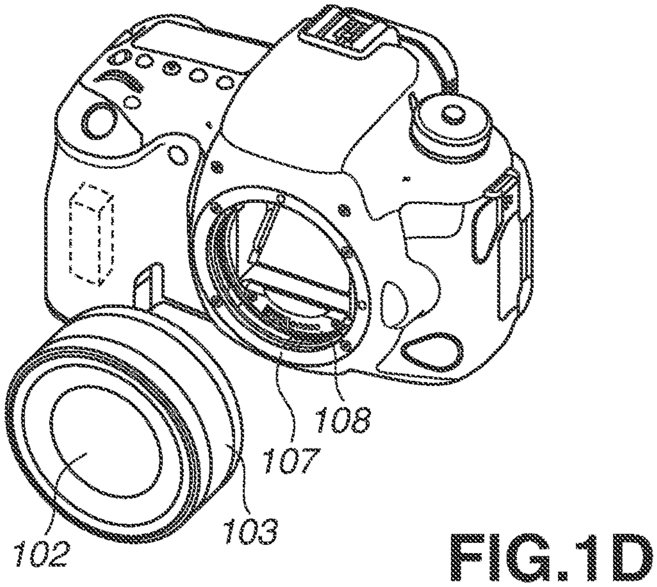
Figure 1D:
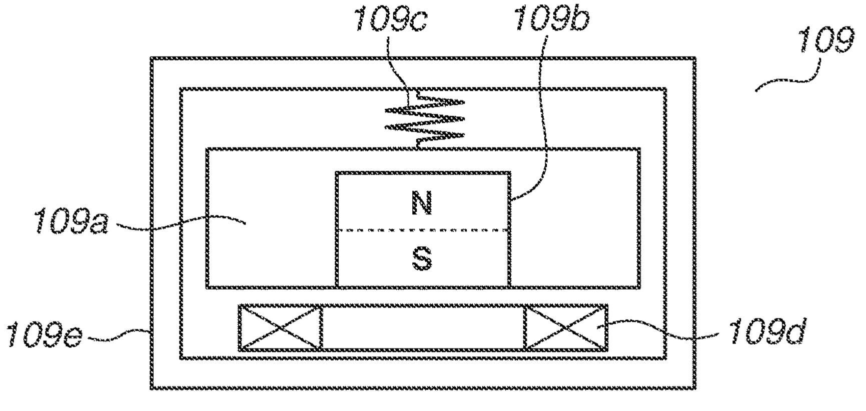

FIGS. 1A, 1B, and 1C are perspective views illustrating a main body of a lens interchangeable digital camera (hereinafter, referred to as a camera) as an imaging apparatus to which an interchangeable lens can be attached, and FIG. 1D is a diagram illustrating a vibration device FIG. 1A is a perspective view illustrating a front side of a main body of a camera 100, and FIG. 1B is a perspective view illustrating a rear side of the main body of the camera 100. FIG. 1C is a diagram illustrating a state where an interchangeable lens 102 is to be attached to the camera 100. FIG. 1D is a diagram illustrating an internal configuration of a vibration device 109.

A front grip 202 that protrudes forward from the camera 100 to allow a user to hold the camera 100 is provided on the front side of the camera 100.

A mount unit 107 to/from which the interchangeable lens 102 is attachable/detachable is provide at a center of the front side of the camera 100.

A rotational operation ring 103 is provided on an outer periphery of the interchangeable lens 102.

The rotational operation ring 103 can be operated rotationally around an optical axis of the interchangeable lens 102 by the user. The user can assign functions to change imaging conditions such as a focal position and an exposure value, to the rotational operation ring 103.

A power supply lever 104, a mode dial 105, and a release button (i.e., imaging start operation unit) 106 are provided on an upper surface of the camera 100.

The power supply lever 104 is an operation unit for switching on/off of power supply of the camera 100 by the user's lever operation.

The mode dial 105 is an operation unit for switching various kinds of imaging modes rotational operation by the user's rotational operation.

Examples of the various kinds of imaging modes include a manual still image imaging mode in which the imaging conditions such as a shutter speed and an aperture value are optionally settable by the user, an automatic still image imaging mode in which a proper exposure amount is automatically obtainable, and a movie imaging mode to capture a moving image.

The release button 106 is an imaging start operation unit (imaging input unit) to start imaging in response to pressing operation by the user. The vibration device 109 described below is attached to an inside of the front grip 202.

The release button 106 has a function to start imaging preparation operation by a first switch (SW1), and a function to instruct imaging start operation (exposure start) by a second switch (SW2).

The vibration device 109 is of, for example, a linear resonant actuator (LRA) type or a piezoelectric element type, and has variably settable vibration parameters such as a vibration intensity (amplitude) and a vibration frequency.

The vibration device 109 generates vibration in response to user operation of the operation member such as the rotational operation ring 103, the mode dial 105, and the release button 106.

Further, the vibration device 109 can generate vibration with various vibration patterns based on the changed vibration parameters.

A rear-surface operation unit (operation unit) 110 and a display unit 111 are provided on the rear surface of the camera 100.

When a power supply of the camera 100 is turned on and the still image imaging mode or the movie imaging mode is set, the display unit 111 displays an object image (live image) based on an image signal captured by an imaging device (not illustrated).

The display unit 111 further displays imaging parameters indicating the imaging conditions such as a shutter speed and an aperture value.

The user operates the rear-surface operation unit 110 while viewing display on the display unit 111, thereby enabling the set values of the imaging parameters to change.

The rear-surface operation unit 110 includes a reproduction button 1101 to instruct reproduction of a recorded captured image. When the user operates the reproduction button 1101, the captured image is reproduced and displayed on the display unit 111.

The rear-surface operation unit 110 further includes a movie button 1102 to instruct movie imaging. When the user operates the movie button 1102, the movie imaging is started or stopped.

The mount unit 107 of the camera 100 includes electrical contacts 108. The camera 100 communicates with and supplies power to the interchangeable lens 102 attached to the mount unit 107, through the electrical contacts 108.

<Internal Configuration of Vibration Device>

FIG. 1D illustrates an internal configuration of the vibration device 109 attached to the inside of the front grip 202.

The vibration device 109 of the LRA type includes a vibrator 109*a*, a magnet 109*b*, a spring 109*c*, a coil 109*d*, and a base 109*e*.

The vibrator 109*a* holds the magnet 109*b*, and is movably coupled to the base 109*e* by the spring 109*c*.

Figure 2:
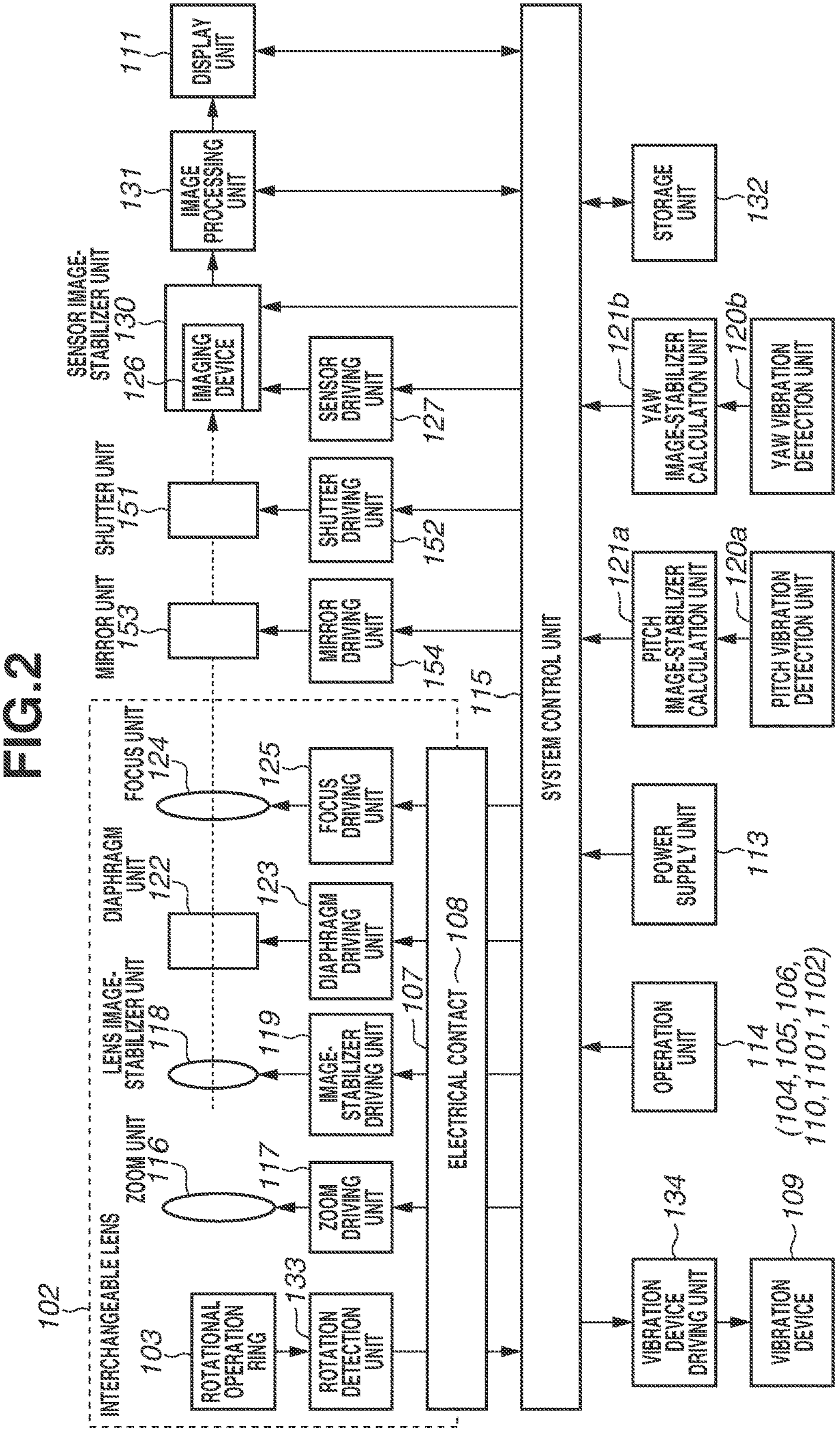
FIG. 2 is a block diagram illustrating a configuration of the camera according to the exemplary embodiment of the present disclosure.

The coil 109*d* is disposed near the magnet 109*b*, and is electrically connected to a system control unit 115 (see FIG. 2).

The coil 109*d* generates electromagnetic force by receiving current from the system control unit 115, and the vibrator 109*a* reciprocates by the electromagnetic force of the coil 109*d*, and absorption force or reaction force with the magnet 109*b*. As a result, vibration occurs on the vibration device 109.

<Block Diagram of Entire Camera System>

FIG. 2 illustrates an electrical and optical configuration of the camera 100.

The camera 100 includes a power supply unit 113 that supplies power to each of units described below, and an operation unit 114 including the power supply lever 104, the mode dial 105, the release button 106, and the rear-surface operation unit 110 described above.

The system control unit 115 controls the entire camera system including the camera 100 and the interchangeable lens 102.

At this time, the interchangeable lens 102 performs communication with the system control unit 115 through the above-described electrical contacts 108.

The system control unit 115 reads out and executes a control program stored in a memory (not illustrated) to control the entire camera system.

The interchangeable lens 102 includes a zoom unit 116 and a lens image-stabilizer unit 118. The zoom unit 116 includes a zoom lens that varies magnification by moving in an optical axis direction. The lens image-stabilizer unit 118 includes a shift lens that moves (shifts) in X/Y axis directions orthogonal to the optical axis, to reduce (correct) image shake.

The interchangeable lens 102 further includes a diaphragm unit 122 having a light quantity adjustment function, and a focus unit 124 including a focus lens that moves in the optical axis direction to perform a focal adjustment.

The interchangeable lens 102 further includes a rotation detection unit 133 for detecting rotation of the rotational operation ring 103.

The system control unit 115 receives an instruction to vary magnification through the rotation detection unit 133 when the rotational operation ring 103 is operated.

In this case, the system control unit 115 varies magnification by controlling driving of the zoom unit 116 through a zoom driving unit 117 provided in the interchangeable lens 102.

Further, the system control unit 115 controls driving of the diaphragm unit 122 through a diaphragm driving unit 123 provided in the interchangeable lens 102, based on a set aperture value received from the operation unit 114 or a luminance signal acquired from an image processing unit 131.

The system control unit 115 performs autofocusing by controlling driving of the focus unit 124 through a focus driving unit 125 provided in the interchangeable lens 102, based on a focus signal acquired from the image processing unit 131.

The camera 100 includes a pitch image-stabilizer calculation unit 121*a* and a yaw image-stabilizer calculation unit 121*b*.

The pitch image-stabilizer calculation unit 121*a* calculates a shift position of the lens image-stabilizer unit 118 (shift lens) and a sensor image-stabilizer unit 130 (imaging device 126) in the Y-axis direction by using a vibration signal from a pitch vibration detection unit 120*a*.

Further, the yaw image-stabilizer calculation unit 121*b* calculates shift positions of the lens image-stabilizer unit 118 and the sensor image-stabilizer unit 130 in the X-axis direction by using a vibration signal from a yaw vibration detection unit 120*b*.

The camera 100 includes a sensor driving unit 127 for driving the sensor image-stabilizer unit 130. The interchangeable lens 102 includes an image-stabilizer driving unit 119 for driving the lens image-stabilizer unit 118.

The system control unit 115 controls the shift positions of the lens image-stabilizer unit 118 and the sensor image-stabilizer unit 130 based on the shift positions in the pitch/yaw directions calculated by the pitch image-stabilizer calculation unit 121*a* and the yaw image-stabilizer calculation unit 121*b*.

In this case, the system control unit 115 controls the shift positions of the lens image-stabilizer unit 118 and the sensor image-stabilizer unit 130 through an image-stabilizer driving unit 119 and the sensor driving unit 127.

In this way, the image-stabilizing operation for preventing image blur is performed.

The camera 100 includes a mirror unit 153 including a main mirror and a submirror (not illustrated), and a mirror driving unit 154 for driving the mirror unit 153.

The camera 100 includes a shutter unit 151 including a mechanical focal plane shutter (not illustrated), and a shutter driving unit 152 for driving the shutter unit 151.

Further, the system control unit 115 controls driving of the shutter unit 151 and the mirror unit 153 respectively through the shutter driving unit 152 and the mirror driving unit 154, in response to an imaging instruction operation of the release button 106.

In this way, an optical image formed by the interchangeable lens 102 on the imaging device 126, the imaging device 126 photoelectrically converts the formed optical image into an imaging signal, and the imaging signal is output.

The image processing unit 131 performs various kinds of image processing on the imaging signal to generate an image signal, and stores the image signal in a storage unit 132 such as a Secure Digital (SD) card.

The display unit 111 displays the image that is based on the image signal (live image) output from the image processing unit 131, and reproduces and displays the captured image stored in the storage unit 32.

Upon detecting the operation of the rotational operation ring 103 or the operation unit 114, the system control unit 115 causes a vibration device driving unit (vibration control unit) 134 to output a driving signal to the vibration device 109, thereby causing the vibration device 109 to generate vibration.

As described above, the vibration device 109 applies vibration to the front grip 202 illustrated in FIG. 1A.

In this way, it is possible to give click feeling to the rotational operation of the rotational operation ring 103 and operation-feeling to the operation of the operation unit 114, to the user holding the front grip 202.

<Exploded Perspective View of Units of Camera>

Figure 3:
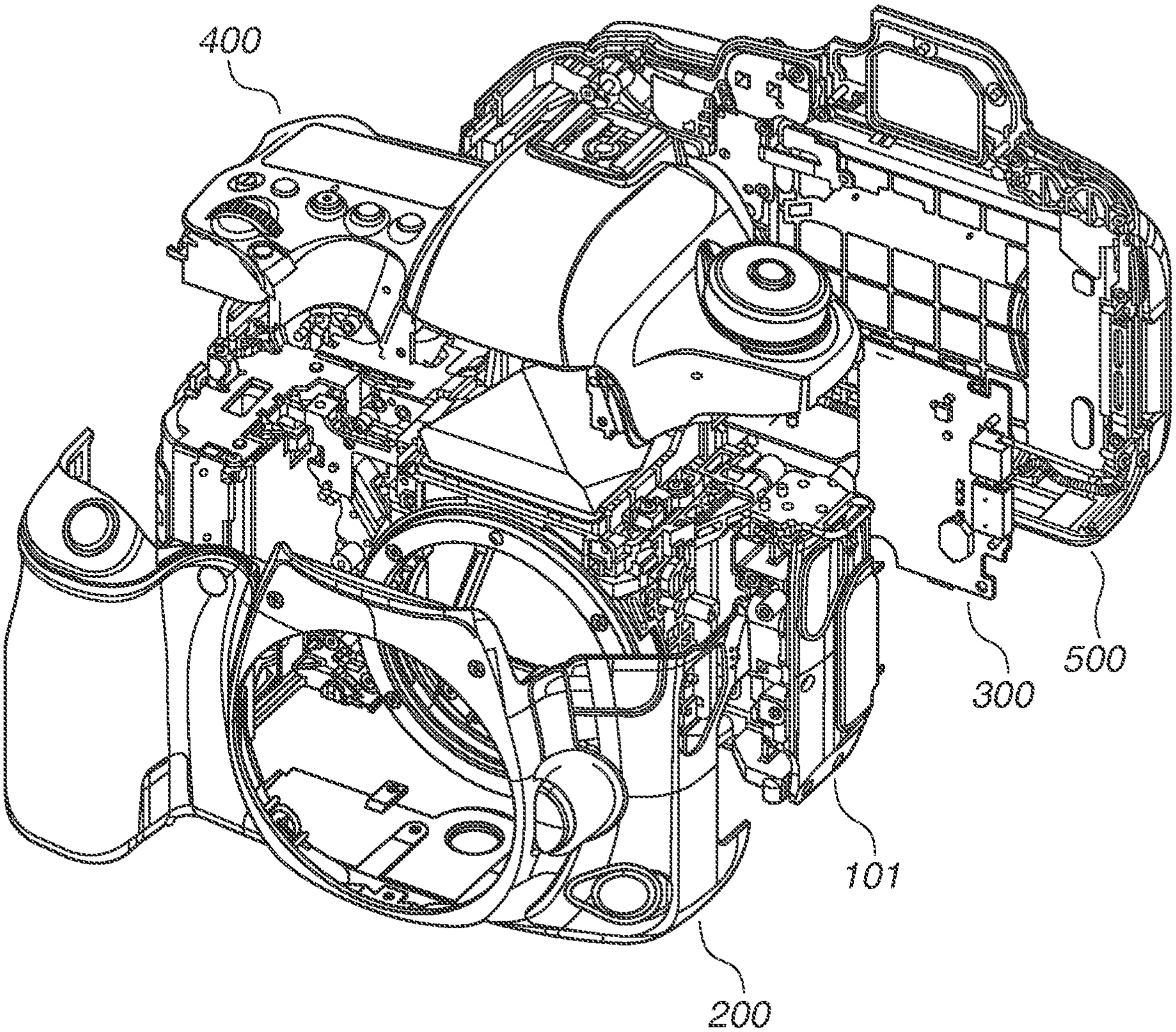
FIG. 3 is an exploded perspective view of the camera according to the exemplary embodiment of the present disclosure.

FIG. 3 is an exploded perspective view of the units of the camera 100.

The camera 100 includes an internal structure 101, a front cover unit 200, an upper surface cover unit 400, and a rear cover unit 500. The system control unit 115 is fastened to the internal structure 101 with screws.

<Front Cover Unit>

Figure 4A:
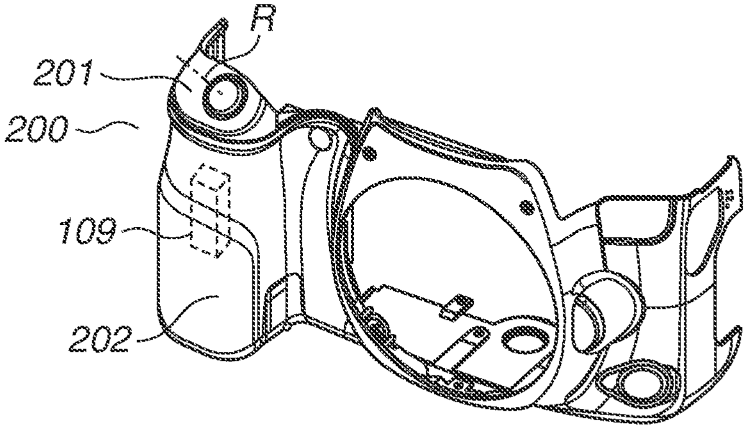
FIGS. 4A and 4B are exploded perspective views of a front cover unit according to the exemplary embodiment of the present disclosure.
Figure 4B:
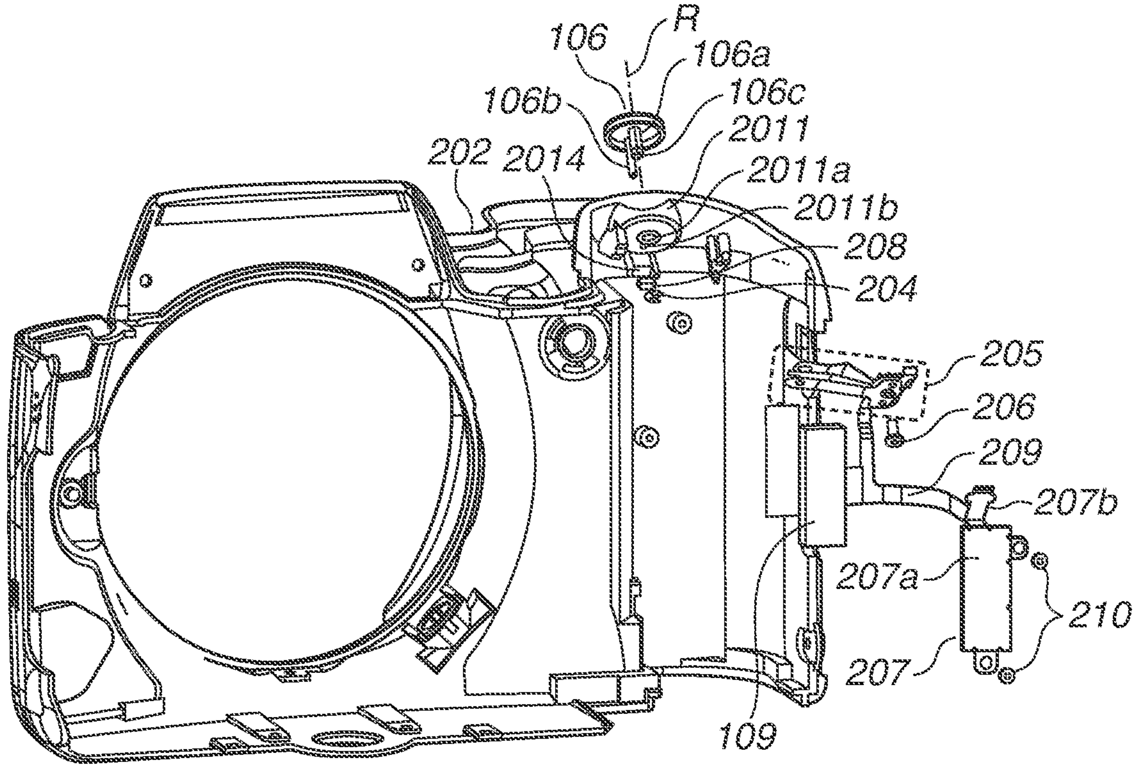

FIG. 4A is a front perspective view of the front cover unit 200, and FIG. 4B is a rear exploded perspective view of the front cover unit 200.

The front cover unit 200 includes the front cover unit 200 made of a resin as an exterior cover, and the front grip 202 to be held by the user. The front grip 202 has elasticity on a surface layer.

The front grip 202 is assembled from outside of the front cover 201, and is fixed with a double-sided tape (not illustrated).

A pusher 106*a* and an abutting portion 106*b* that extend in a pushing direction (hereinafter, referred to as R-axis direction) of the release button 106 are provided on a rear surface of the release button 106.

The pusher 106*a* of the release button 106 includes a groove 106*c* to which an E-ring 204 is attached.

The front cover 201 includes a housing portion 2011 for housing the release button 106.

The front cover 201 includes, in the housing portion 2011, through-holes 2011*a* and 2011*b* into which the pusher 106*a* and the abutting portion 106*b* of the release button 106 are respectively inserted.

The release button 106 is assembled to the housing portion 2011 from the outside of the front cover 201, and the E-ring 204 is assembled to the groove 106*c* of the pusher 106*a* that penetrates through the front cover 201.

The release button 106 that instructs setting change of the imaging conditions and start/end of imaging is prevented by the E-ring 204 from coming off from the front cover 201.

A vibration attenuation member 208 is a part having rectangular shape, and is made of a material such as a rubber and an elastomer that is largely deformed by a small force and has a large elastic deformation region.

The vibration attenuation member 208 is fixed, with a double-sided tape (not illustrated), to a seat 2014 provided inside the front cover 201.

The two-stage pressing operation of the release button 106 is detected by a switch unit 205. The switch unit 205 includes three contact pieces 2051, 2052, and 2053 described below, and is configured in such a manner that the first switch (SW1) and the second switch (SW2) are sequentially turned on corresponding to a pushed amount.

The switch unit 205 includes a flexible substrate 209 on which a plurality of circuits is mounted, and the three contact pieces 2051, 2052, and 2053 are in contact with and electrically connected to the respective circuits of the flexible substrate 209.

Further, the flexible substrate 209 includes circuits for driving the vibration device 109, and the vibration device 109 and the circuits on the flexible substrate 209 are electrically connected.

The flexible substrate 209 is connected to the system control unit 115 (see FIG. 2). The switch unit 205 is fixed to the inside of the front cover 201 with a screw 206.

A holding part 207 includes a base surface 207*a* to which the vibration device 109 is fixed, and a vibration propagation portion 207*b* that extends from the base surface 207*a* and is elastically deformable in the R-axis direction.

The vibration device 109 is fixed to the base surface 207*a* of the holding part 207 with a double-sided tape (not illustrated).

The holding part 207, to which the vibration device 109 has been fixed, is fixed to the inside of the front cover 201 with screws 210.

The vibration propagation portion 207*b* abuts on the vibration attenuation member 208 in a state where the release button 106 for instructing setting change of the imaging conditions and start/end of imaging is not operated (normal state).

As described above, the release button 106, the switch unit 205, the holding part 207 that fixes the vibration device 109, and the vibration attenuation member 208 are fixed to the same front cover 201.

Assembling the parts to the front cover 201 in the above-described manner makes it possible to reduce assembly tolerance caused by assembling. Accordingly, it is possible to easily adjust the positional relationship of the related parts.

Figure 5A:
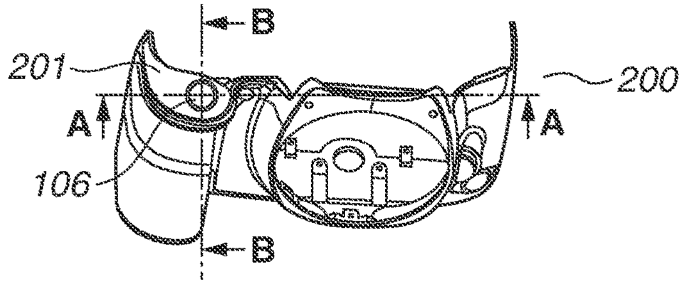
FIGS. 5A, 5B, 5C, and 5D are cross-sectional views of the front cover unit and diagrams illustrating a propagation state of vibration generated by the vibration device, according to the exemplary embodiment of the present disclosure.
Figure 5B:
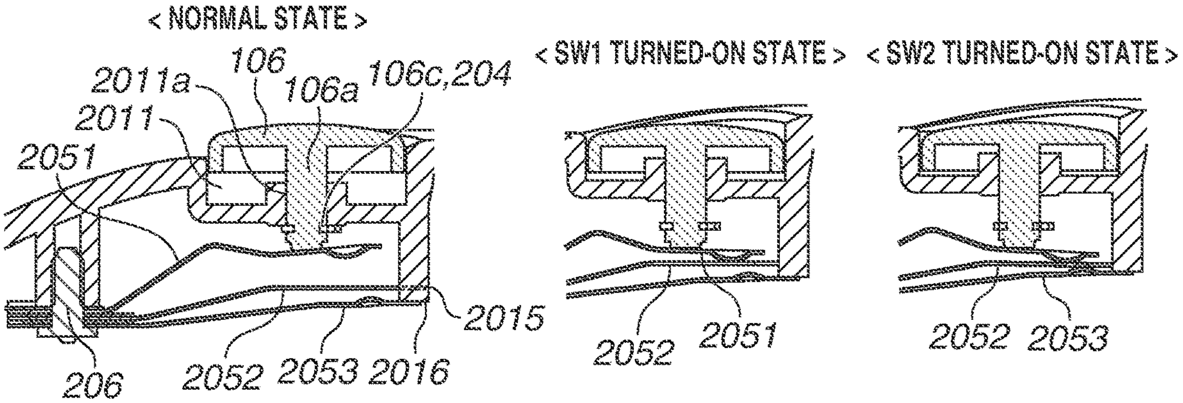
Figure 5C:
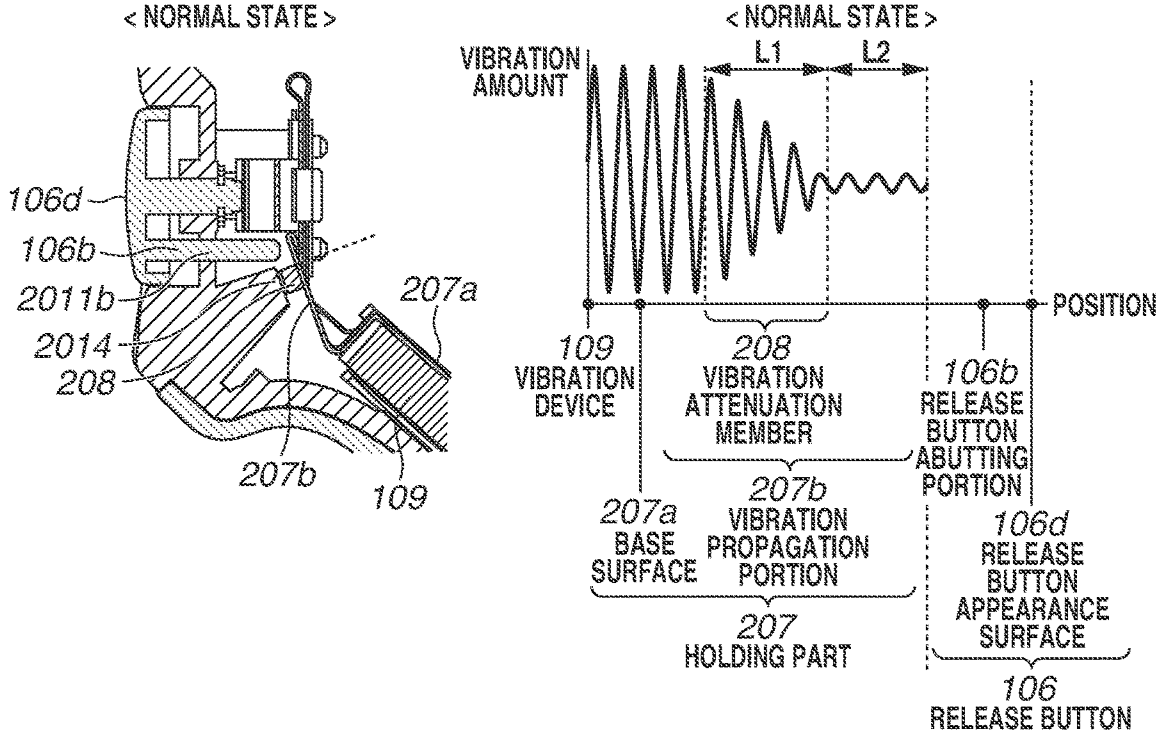
Figure 5D:
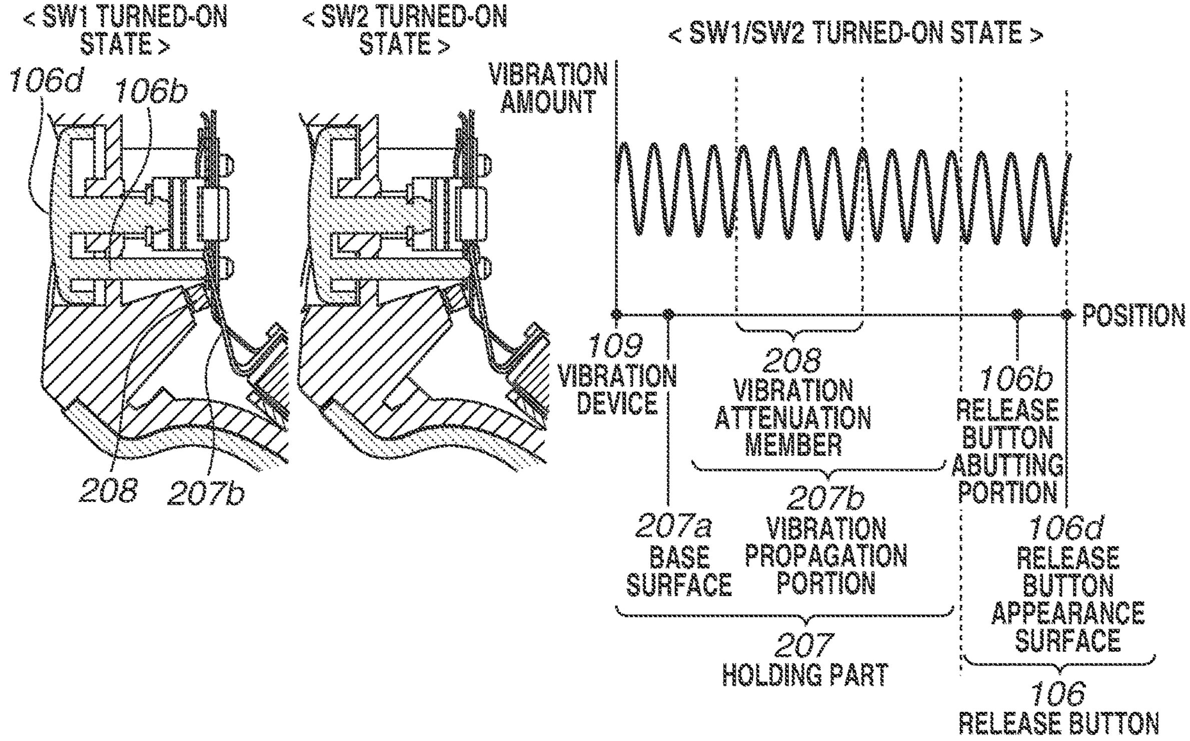

FIG. 5A illustrates the front cover unit 200 viewed from just above the release button 106, and FIGS. 5B, 5C, and 5D each illustrate a cross-section taken along line A-A and line B-B in FIG. 5A.

The line A-A and the line B-B pass through a center axis of the pusher 106*a* of the release button 106.

The normal state in FIGS. 5B and 5C indicates a state where the release button 106 is not pressed, i.e., the release button 106 is at an initial position.

A SW1 turned-on state in FIGS. 5B and 5D indicates a state where the release button 106 is pressed and the first switch (SW1) is turned on.

A SW2 turned-on state in FIGS. 5B and 5D indicates a state where the release button 106 is further pressed from the SW1 turned-on state and the second switch (SW2) is turned on.

The switch unit 205 is fixed to the inside of the front cover 201 with the screw 206.

The switch unit 205 includes the first contact piece 2051, the second contact piece 2052, and the third contact piece 2053 provided in this order from the release button 106 side, and these contact pieces are insulated from one another.

A free end of the first contact piece 2051 urges the release button 106 upward by coming into pressure contact with a front end of the pusher 106*a* of the release button 106.

The E-ring 204 assembled to the groove 106*c* of the abutting portion 106*b* abuts on a lower end of the housing portion 2011 of the front cover 201, which regulates an upper position of the release button 106 in the R-axis direction.

A free end of the second contact piece 2052 and a free end of the third contact piece 2053 respectively abut on position regulation portions 2015 and 2016 of the front cover 201, which regulates positions of the free ends of the second contact piece 2052 and the third contact piece 2053 in the R-axis direction.

The release button 106 is pushed down against the elastic force of the first contact piece 2051, from the normal state of FIG. 5B.

As a result, as illustrated in the SW1 turned-on state in FIG. 5B, the first contact piece 2051 elastically deforms and contacts the second contact piece 2052, and the first switch (SW1) is turned on.

When the first switch (SW1) is turned on, the focus driving unit 125 drives the focus unit 124 to perform focus adjustment.

In addition, the diaphragm driving unit 123 drives the diaphragm unit 122 to perform automatic exposure adjustment (AE) processing, and the system control unit 115 performs imaging preparation such as automatic white balance (AWB) processing and flash pre-emission (EF) processing.

When the release button 106 is further pushed down, the second contact piece 2052 contacts the third contact piece 2053 and the second switch (SW2) is turned on as illustrated in the SW2 turned-on state in FIG. 5B.

When the second switch (SW2) is turned on, the shutter driving unit 152 drives the shutter unit 151, and an optical image is formed on the imaging device 126 by the interchangeable lens 102.

FIG. 5C illustrates a positional relationship of the abutting portion 106*b*, the vibration propagation portion 207*b*, and the vibration attenuation member 208, and a propagation state of vibration generated by the vibration device 109, in the normal state of the release button 106.

In the normal state illustrated in FIG. 5C, the vibration attenuation member 208 is brought into a pressure contact state by the vibration propagation portion 207*b*.

The vibration generated by the vibration device 109 propagates to the vibration propagation portion 207*b* through the base surface 207*a* of the holding part 207.

The vibration propagating to the vibration propagation portion 207*b* is attenuated in a section L1 where the vibration propagation portion 207*b* abuts on the vibration attenuation member 208.

Accordingly, the vibration propagating to a section L2 on the free end side of the vibration propagation portion 207*b* is smaller than the vibration generated by the vibration device 109.

Further, in the normal state, the vibration propagation portion 207*b* is separated from the release button 106. Therefore, the vibration does not propagate to the release button 106 directly from the vibration propagation portion 207*b*.

In other words, even when the vibration device 109 is driven in the normal state, noise generated from the release button 106 as a movable portion and noise generated due to the vibration of the elastically-deformable vibration propagation portion 207*b* can be minimized.

FIG. 5D illustrates the positional relationship of the abutting portion 106*b*, the vibration propagation portion 207*b*, and the vibration attenuation member 208, and the propagation state of the vibration generated by the vibration device 109, in the SW1/SW2 turned-on state of the release button 106.

Immediately before the release button 106 is put into the SW1 turned-on state in FIG. 5D, the abutting portion 106*b* of the release button 106 starts to abut on the vibration propagation portion 207*b*, and the vibration propagation portion 207*b* starts to be pressed downward.

In other words, when the user presses down the release button 106, a pressed amount of the vibration attenuation member 208 by the vibration propagation portion 207*b* is gradually reduced.

In the SW1/SW2 turned-on state in FIG. 5D, the vibration propagation portion 207*b* moves downward to a position where the vibration propagation portion 207*b* does not contact the vibration attenuation member 208.

As described above, when the user operates the release button 106 and the release button 106 is positioned in the SW1/SW2 turned-on state, the vibration propagation portion 207*b* contacts the abutting portion 106*b* of the release button 106, and is separated from the vibration attenuation member 208.

The vibration generated by the vibration device 109 propagates to the vibration propagation portion 207*b* through the base surface 207*a* of the holding part 207, and propagates to an appearance surface 106*d* of the release button 106 through the abutting portion 106*b* of the release button 106 without being largely attenuated.

Even when the vibration of the vibration device 109 is suppressed in the SW1/SW2 turned-on state, the vibration can give operation-feeling to a finger operating the release button 106 without being largely attenuated.

In other words, the noise generated due to the vibration of the vibration device 109 when the release button 106 is operated can be minimized.

<Timing Chart of Control Unit in Imaging>

Figure 6:
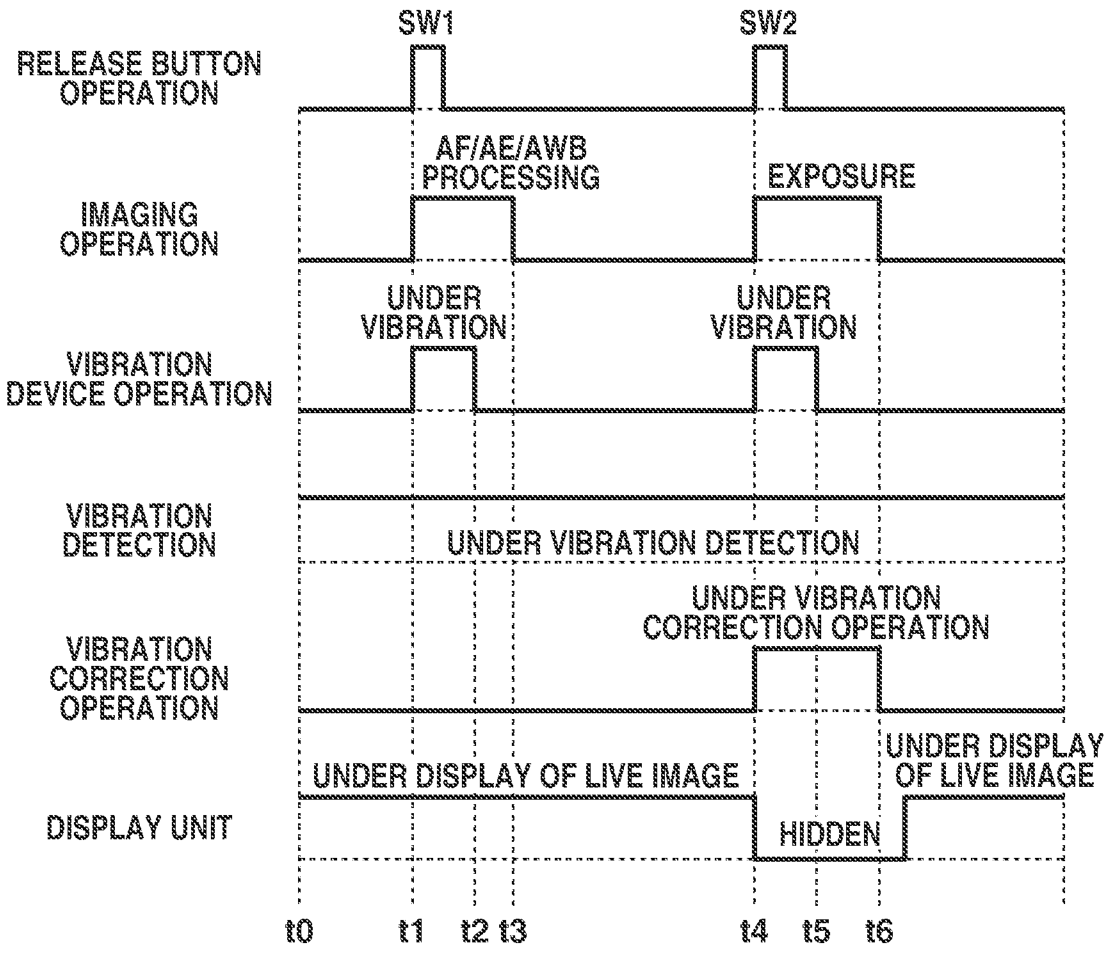
FIG. 6 is a timing chart of a control unit in imaging by the camera according to the exemplary embodiment of the present disclosure.

FIG. 6 is a timing chart illustrating progress of processing performed by the system control unit 115 at the time of imaging by the camera 100 illustrated in FIG. 2.

In FIG. 6, during a period from time t0 to time t4, a live image is displayed on the display unit 111. Further, the pitch vibration detection unit 120*a* and the yaw vibration detection unit 120*b* constantly detect vibration of the camera 100.

Next, at time t1, the system control unit 115 starts vibration device operation processing in response to the detection of a half-depression operation (SW1) of the release button 106 by the user, and transmits the driving signal to the vibration device 109.

During a period from time t1 to time t2, the vibration device 109 vibrates in response to the driving signal, and feeds back touch sense (touch feeling) of the half-depression operation to the user.

During a period from time t1 to time t3 immediately after the driving signal is transmitted to the vibration device 109, the system control unit 115 performs the AF processing, the AE processing, and the AWB processing.

Next, when full-depression operation (SW2) of the release button 106 by the user is detected at time t4, the system control unit 115 starts the vibration device operation processing, and transmits the driving signal to the vibration device 109.

During a period from time t4 to time t5, the vibration device 109 vibrates in response to the driving signal, and feeds back touch sense (touch feeling) of full-depression operation to the user.

Exposure processing that is performed during a period from time t4 to time t6 immediately after the driving signal is transmitted to the vibration device 109 is described.

During that period, the system control unit 115 drives the lens image-stabilizer unit 118 and the sensor image-stabilizer unit based on vibration signals detected by the pitch vibration detection unit 120*a* and the yaw vibration detection unit 120*b*, to correct camera shake, and causes the imaging device 126 to perform the exposure processing.

In the timing chart of FIG. 6, a vibration generation period (time t4 to time t5) of the vibration device 109 generated in response to the detection of SW2 is overlapped with a vibration signal detection period during which the camera-shake correction is performed and an exposure period (time t4 to time t6) when the exposure is performed while the camera-shake correction is performed.

In other words, when the vibration device 109 is driven and generates vibration, if the vibration influences on the pitch vibration detection unit 120*a*, the yaw vibration detection unit 120*b*, the lens image-stabilizer unit 118, and the sensor image-stabilizer unit 130, the result of the camera-shake correction may be influenced.

Thus, unlike the operation of the other operation units, when the release button 106 is operated, it is necessary to suppress vibration of the vibration device 109, and to minimize influence on the pitch vibration detection unit 120*a*, the yaw vibration detection unit 120*b*, the lens image-stabilizer unit 118, and the sensor image-stabilizer unit 130.

As described with reference to FIGS. 5A, 5B, 5C, and 5D, when the release button 106 is operated, the vibration propagation portion 207*b* abuts on the abutting portion 106*b* of the release button 106.

Thus, even when the vibration of the vibration device 109 is suppressed, it is possible to give operation-feeling by vibration to the finger operating the release button 106.

In other words, when the release button 106 is operated, it is possible to give imaging operation-feeling to the user while minimizing the noise generated by the vibration of the vibration device 109.

<Vibration Device Management Pattern of Camera>

Vibration device management tables of the camera 100 are described with reference to FIGS. 7A, 7B, and 7C. The vibration device 109 provided in the camera 100 is controlled based on a specific vibration pattern.

Parameters for determining the vibration pattern include a vibration frequency when the vibration device 109 is driven, an amplitude to adjust intensity of the vibration itself, and a vibration duration about a period when the touch sense (touch feeling) can be felt.

For example, in a case where the release button 106 or the operation unit 114 of the camera 100 is operated, the same vibration pattern is used irrespective of the state of the imaging settings.

In this case, an operation-feeling different from the operation-feeling desired by the user is given to the user, which may cause the user to feel discomfort.

Therefore, in the exemplary embodiment of the present disclosure, the vibration device 109 is made to be able to be driven based on a vibration pattern corresponding to each of imaging settings made by the user.

Vibration pattern management tables (hereinafter, referred to as management tables) as illustrated in FIGS. 7A, 7B, and 7C are stored in the storage unit 132 of the camera 100 as management data information, and the system control unit 115 can change the vibration table To a vibration pattern corresponding to the imaging settings set by the user.

<Association Diagram of Consecutive Imaging Setting and Vibration Device Management Table>

First, FIG. 7A is a diagram in which a silent mode, a shutter system, consecutive imaging setting, and the vibration device management table are associated with one another in an operation mode of the vibration device 109 when the release button 106 is operated, as an example of the exemplary embodiment of the present disclosure.

In a case where the user selects the mechanical shutter, the vibration device 109 is not operated when the release button 106 is operated because vibration and sound occur by the imaging operation of the mechanical shutter.

In other words, the storage unit 132 does not store the management table for the mechanical shutter mode.

The electronic shutter can perform imaging at shutter speed higher than the limit shutter speed of the mechanical shutter. Thus, the electronic shutter enhances flexibility of exposure, and expands an imaging area without using a filter for adjusting the light quantity, even under high-luminance environment.

However, in the case of the electronic shutter, the user cannot obtain the imaging operation-feeling obtainable by the mechanical shutter. In other words, in the case where the user selects the electronic shutter, it is necessary to transfer the operation-feeling as a substitute for vibration by the mechanical shutter operation, to the user.

For this reason, the storage unit 132 stores a management table T1 for the electronic shutter mode.

The management table T1 manages vibration patterns that can efficiently generate vibration and give the operation-feeling to the user, by vibrating the vibration device 109 at a frequency near a resonance frequency unique to the release button 106.

In a case where the user selects the silent mode suitable for imaging under quiet environment, the system control unit 115 automatically switches the operation mode to an electronic shutter silent mode.

In the electronic shutter silent mode, the imaging operation-feeling is transferred to the user as in the electronic shutter mode, but it is necessary to minimize the noise generated by the vibration device 109.

For this reason, the storage unit 132 stores a management table T3 that manages vibration patterns each minimizing the noise generated by vibration of the vibration device 109.

For example, in comparison to the management table T1, the parameter of the amplitude may be reduced while the parameter of the vibration frequency set to near the resonance frequency is not changed, or the parameter of the vibration frequency set to near the resonance frequency may be changed and the pattern of the amplitude may be further reduced.

Further, the electronic shutter can perform high-speed consecutive imaging that consecutively captures more than several tens of images per each second, depending on the imaging setting.

If, in the high-speed consecutive imaging, the vibration device 109 is driven in the same vibration pattern as in single imaging, the vibration duration of the vibration device 109 in the single imaging is greater than an interval of the high-speed consecutive imaging.

As a result, the imaging timing and the vibration timing are gradually shifted, which may give uncomfortable operation-feeling to the user.

Therefore, the storage unit 132 stores management tables T2 and T4 that are adapted to the interval in the high-speed consecutive imaging by reducing at least the vibration duration as compared with the management tables T1 and T3 for the single imaging.

In a case where the vibration duration cannot be reduced because of the response speed of the vibration device 109 mounted on the camera 100, the parameter of the amplitude may be further changed to adapt to the interval in the high-speed consecutive imaging.

<Management Table T1>

FIG. 7B is a diagram illustrating the management tables T1 and T2 as examples among the above-described four kinds of management tables.

As illustrated in FIG. 7B, each of the management tables manages the vibration patterns corresponding to respective shutter speeds.

Although the detail of the parameters of each of the vibration patterns is not described, synthesized waveforms of vibrations each obtained by combining the vibration frequency, the amplitude, the vibration duration, and the like for driving the vibration device 109 are managed.

In the vibration parameter of a vibration pattern T1-15 in FIG. 7B, at least the parameter of the vibration duration is reduced as compared with the vibration parameter of a vibration pattern T1-10 having low shutter speed.

The change makes it possible to give the operation-feeling causing the user to recognize the increase of the shutter speed that is obtainable by the mechanical shutter.

When the consecutive imaging setting is set to on, the number of consecutively captured images is increased as the shutter speed in the imaging is increased.

The storage unit 132 stores the management table T2 adaptable to the interval of the consecutive imaging corresponding to the shutter speed.

For example, in a vibration pattern T2-15 in FIG. 7B, at least the parameter of the vibration duration is reduced as compared with the vibration pattern T1-15 in which the consecutive imaging setting is set to off. The change makes it possible to give the operation-feeling matching with the interval of the high-speed consecutive imaging of the electronic shutter.

In a case where the vibration duration cannot be reduced because of the response speed of the vibration device 109 mounted on the camera 100, the parameter of the amplitude may be further changed to adapt to the interval in the high-speed consecutive imaging.

In a case where, as in a vibration pattern T1-10 illustrated in FIG. 7B, the shutter speed in the imaging is low and the interval of the consecutive imaging is greater than the vibration duration in the vibration pattern T1-10, the same vibration pattern used when the consecutive imaging is set to off may be stored even when the consecutive imaging is set to on.

<Vibration Patterns in Management Tables T2 and T4>

FIG. 7C is a diagram illustrating the vibration image in a case where the vibration duration of the vibration device 109 in the single imaging is greater than the imaging interval in the high-speed consecutive imaging at any of the vibration patterns in the management tables T2 and T4 adapted to the consecutive imaging.

Upon detecting that the SW2 signal has been turned on, the system control unit 115 refers to the management table, and drives the vibration device 109 in the vibration pattern corresponding to the shutter speed.

In imaging of a first image after the system control unit 115 detects the SW2 signal, the system control unit 115 drives the vibration device 109 in a vibration pattern W1 that is the same as in the single imaging.

In a case where the system control unit 115 continuously detects the SW signal thereafter, the amplitude of the vibration generated by the vibration device 109 is gradually reduced and a vibration convergence time is shortened in imaging for second and third images, to change the vibration pattern to a vibration pattern W2 adaptable to the imaging interval in the high-speed consecutive imaging.

At this time, if the vibration pattern is rapidly changed from the vibration pattern W1 to the vibration pattern W2, the user may feel the large change of the vibration as a discomfort feeling.

Thus, the storage unit 132 stores a vibration pattern that is gradually attenuated from the vibration pattern W1 to the vibration pattern W2 as illustrated in FIG. 7C suitable for the consecutive imaging.

Thereafter, the vibration device 109 generates constant vibration in the vibration pattern W2 adaptable to the interval of the consecutive imaging, and gives the operation-feeling that causes the user to recognize continuation of the imaging.

Further, in a case where the consecutive imaging is continued for a long time, the capacity of the buffer of the storage unit 132 or a recording medium such as an SD card for storing the captured images may become full, and the consecutive imaging may be forcibly terminated.

The user may fail to capture an important imaging scene because the consecutive imaging is forcibly terminated unintentionally.

Thus, when the used capacity of the buffer of the storage unit 132 reaches a certain threshold during the consecutive imaging, the vibration device 109 may be driven in a vibration pattern W3 different from the vibration pattern W2.

Alternatively, the vibration device 109 may be driven in the vibration pattern W3 different from the vibration pattern W2 for every N captured images or for every predetermined number of captured images.

This makes it possible to perform notification to the user before the consecutive imaging is forcibly terminated, or to notify the user of the current number of consecutively captured images.

As described above, the vibration patterns are stored in the management tables T1 to T4, which makes it possible to vibrate the vibration device 109 in the vibration pattern corresponding to each of the imaging settings.

<Flowcharts Illustrated in FIG. 8 to FIG. 13>

The above-described vibration control of the vibration device 109 is described with reference to flowcharts illustrated in FIG. 8 to FIG. 13.

First, when the power supply lever 104 or the reproduction button 1101 of the camera 100 is operated, the system control unit 115 checks a method used for activation in step S101.

In a case where the camera 100 is activated by the reproduction button 1101 (NO in step S101), the processing proceeds to step S102. In step S102, reproduction mode processing is performed. In a case where the camera 100 is activated by the power supply lever 104 (YES in step S101), the processing proceeds to step S103.

In step S103, the system control unit 115 monitors input from the operation unit 114. In a case where the input from the operation unit does not instruct start of the imaging operation (NO in step S103), the processing proceeds to step S104. In step S104, operation input processing is performed.

On the other hand, in a case where the release button 106 or the movie button 1102 for starting the imaging operation has been operated (YES in step S103), the processing proceeds to step S105. In step S105, imaging start processing is performed.

Figure 9:
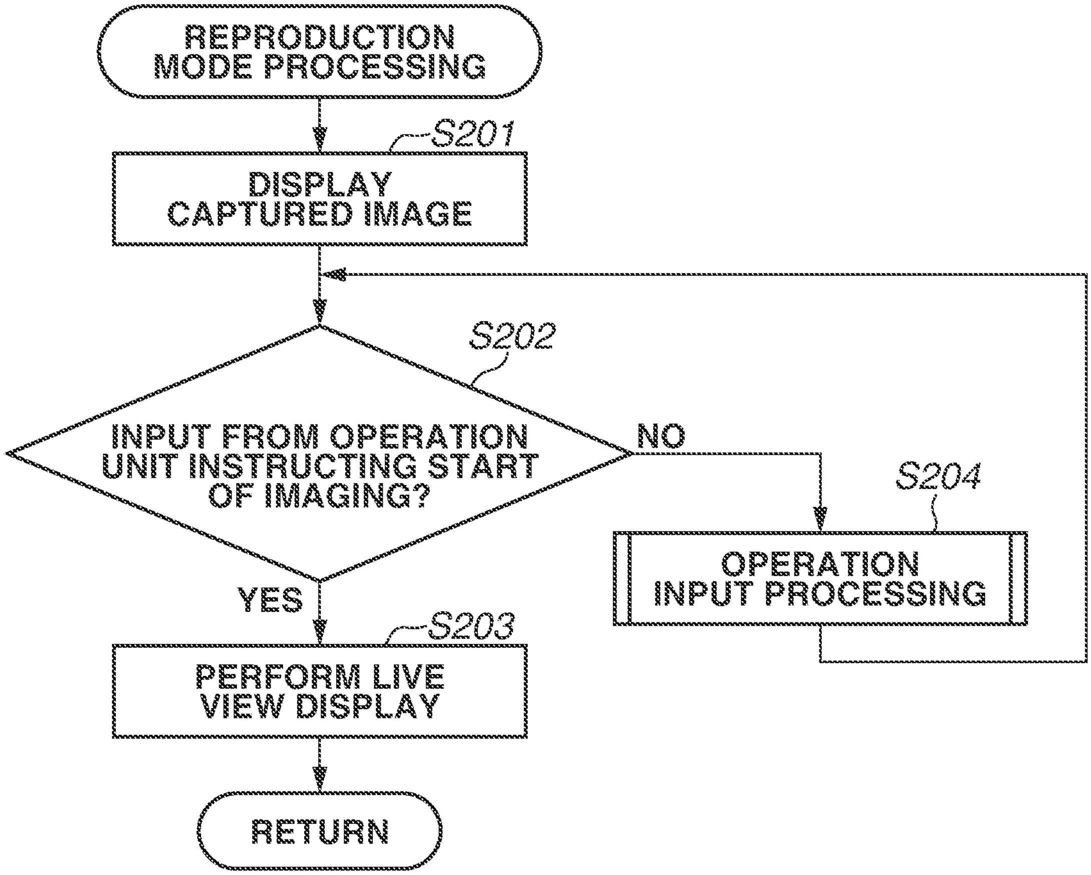
FIG. 9 is a flowchart illustrating a part of the main operation of the camera according to the exemplary embodiment of the present disclosure.

Details of the reproduction mode processing, the operation input processing, and the imaging start processing will be described below with reference to FIG. 9 and FIG. 11.

When the routine of the imaging start processing in step S105 ends, the processing proceeds to step S106. In step S106, the system control unit 115 determines the state of the power supply. In a case where it is determined in step S106 that the power supply has been turned off (YES in step S106), the processing ends. In a case where it is determined in step S106 that the power supply is on (NO in step S106), the processing returns to step S101.

<Reproduction Mode Processing in Step S102>

Figure 8:
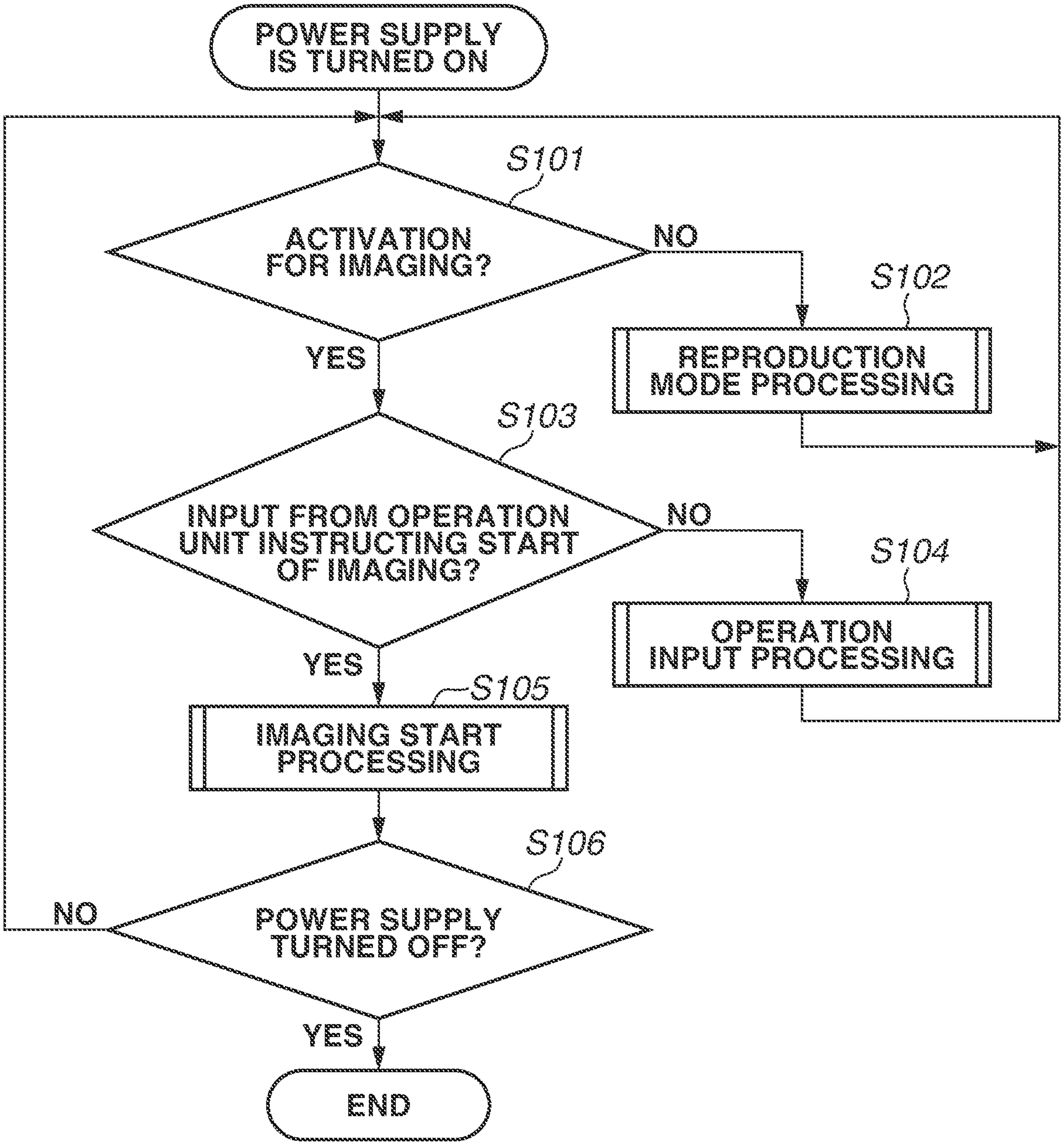
FIG. 8 is a flowchart illustrating a part of main operation of the camera according to the exemplary embodiment of the present disclosure.

Next, the reproduction mode processing in step S102 of FIG. 8 is described with reference to the flowchart of FIG. 9.

First, in step S201, the captured image stored in the recording medium such as an SD card is displayed. In next step S202, the system control unit 115 monitors input from the operation unit 114.

In a case where the operation unit for starting the imaging operation is operated in step S202 (YES in step S202), the processing proceeds to step S203. In step S203, a live view state in which the captured image data is successively displayed is set. Then, the routine of the reproduction mode processing ends.

In a case where the operation unit other than the operation unit for starting the imaging operation is operated in step S202 (NO in step S202), the processing proceeds to step S204. In step S204, operation input processing is performed.

When the routine of the operation input processing in step S204 ends, the processing returns to step S202 to prepare for the next input from the operation unit.

<Operation Input Processing in Step S104>

Figure 10:
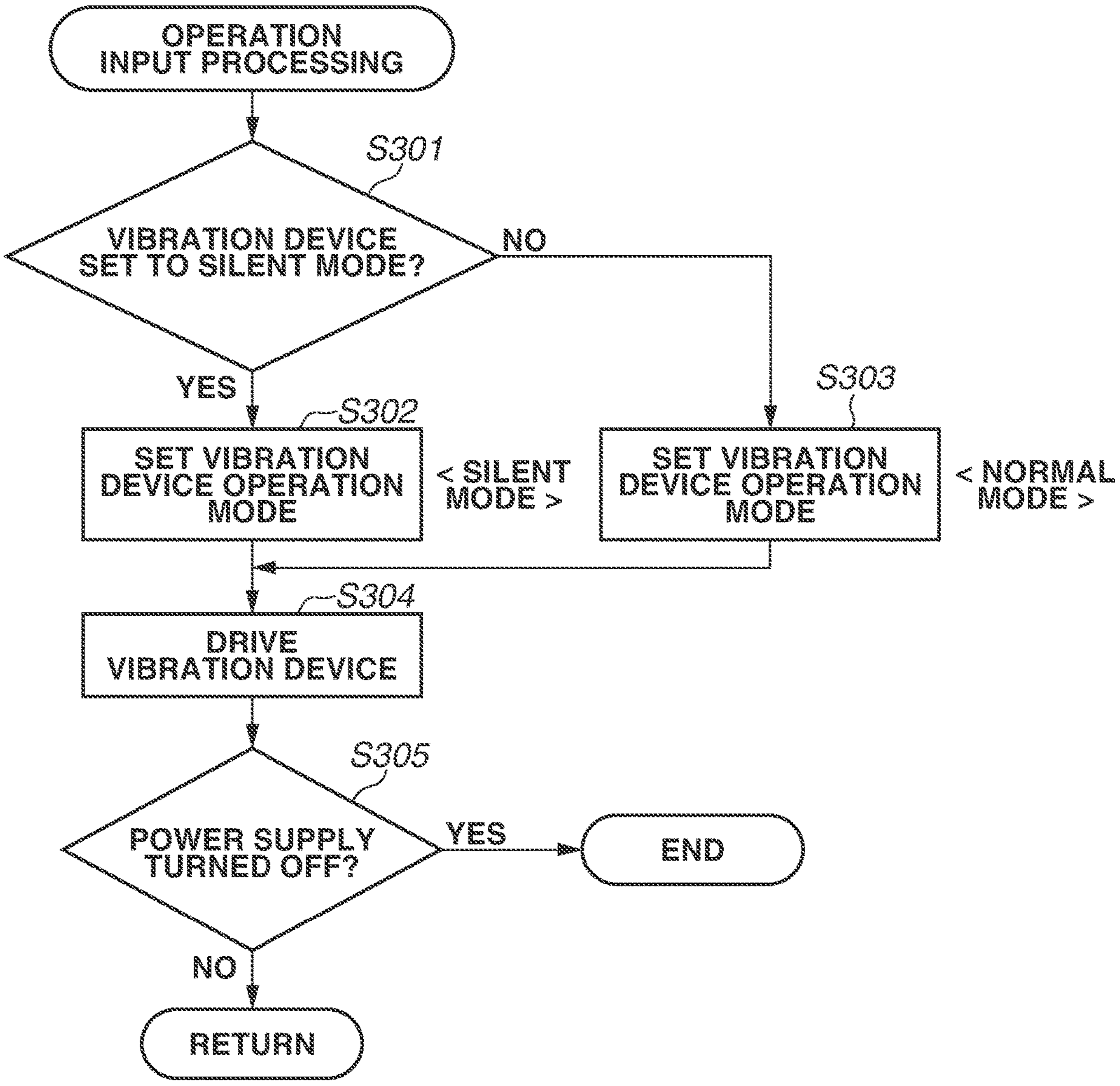
FIG. 10 is a flowchart illustrating a part of the main operation of the camera according to the exemplary embodiment of the present disclosure.

Next, the operation input processing in step S104 of FIG. 8 is described with reference to the flowchart of FIG. 10.

First, in step S301, the system control unit 115 checks a silent mode setting state for the vibration device 109. In a case where the silent mode has been set to on (YES in step S301), the processing proceeds to step S302. In step S302, the operation mode of the vibration device 109 is set to the silent mode.

On the other hand, in a case where the silent mode has been set to off (NO in step S301), the processing proceeds to step S303. In step S303, the operation mode of the vibration device 109 is set to the normal mode.

The set operation mode of the vibration device 109 is stored in an internal memory of the system control unit 115 or in the storage unit 32.

In step S304, the system control unit 115 issues an instruction to drive the vibration device 109 based on the operation mode of the vibration device 109 set in step S302 or S303.

With this instruction, the system control unit 115 controls the vibration device driving unit 134 to vibrate the vibration device 109, and feeds back the operation-feeling of the input via the operation unit, to the user.

In step S305, the system control unit 115 checks the power supply state of the camera 100. In a case where the power supply has been turned off (YES in step S305), the system control unit 115 performs processing to end the system. In a case where the power supply is on (NO in step S305), the routine of the reproduction mode processing ends.

<Imaging Start Processing in Step S105>

Next, the imaging start processing in step S105 of FIG. 8 is described with reference to the flowchart in FIG. 11.

First, in step S401, the system control unit 115 checks the imaging mode. In a case where the imaging mode has been set to a movie imaging mode (NO in step S401), the processing proceeds to step S402. In step S402, movie mode processing is performed. In a case where the imaging mode has been set to a still image imaging mode (YES in step S401), the processing proceeds to step S403.

In step S403, the system control unit 115 checks the operation mode of the shutter. In a case where the electronic shutter mode has been set to on (YES in step S403), the processing proceeds to step S404. In step S404, the system control unit 115 checks the operation mode of the vibration device 109.

In a case where the silent mode has been set to on (YES in step S404), the processing proceeds to step S405. In step S405, electronic shutter silent mode processing is performed. In a case where the silent mode has been set to off (NO in step S404), the processing proceeds to step S406. In step S406, the system control unit 115 checks the lens 102 attached to the camera 100.

For example, in a case where the lens 102 is a lens having high sensitivity to camera shake, such as a telephoto lens and a macro lens (YES in step S406), the processing proceeds to step S405.

In a case where the lens 102 is a lens having a high sensitivity area and a low sensitivity area to the camera shake, such as a zoom lens (NO in step S406), the processing proceeds to step S407. In step S407, a focal length of the imaging optical system set by the user and sensitivity at the focal length are checked.

In a case where the sensitivity is higher than a predetermined value (YES in step S407), the processing proceeds to step S405. In a case where the sensitivity is lower than the predetermined value (NO in step S407), the processing proceeds to step S408. In step S408, electronic shutter mode processing is performed.

On the other hand, in a case where the electronic shutter mode has been set to off in step S403 (NO in step S403), the processing proceeds to step S409.

In step S409, the system control unit 115 checks whether the mode dial 105 has been set to a specific imaging mode (hereinafter, referred to as plus movie auto mode).

In the plus movie auto mode, when the still image is captured, the still image is recorded and the movie for predetermined seconds before the still image is captured, is recorded at the same time. Therefore, it is demanded to reduce the operation sound generated in the imaging.

Accordingly, in a case where the plus movie auto mode has been set (NO in step S409), the processing proceeds to step S405. In step S405, the electronic shutter silent mode processing is performed.

In a case where the imaging mode is set to a mode other than the plus movie auto mode (YES in step S409), the processing proceeds to step S410. In step S410, mechanical shutter mode processing is performed. As described above, monitoring the setting states of the imaging mode and the shutter mode enables selection of the suitable operation mode of the vibration device 109.

Figure 11:
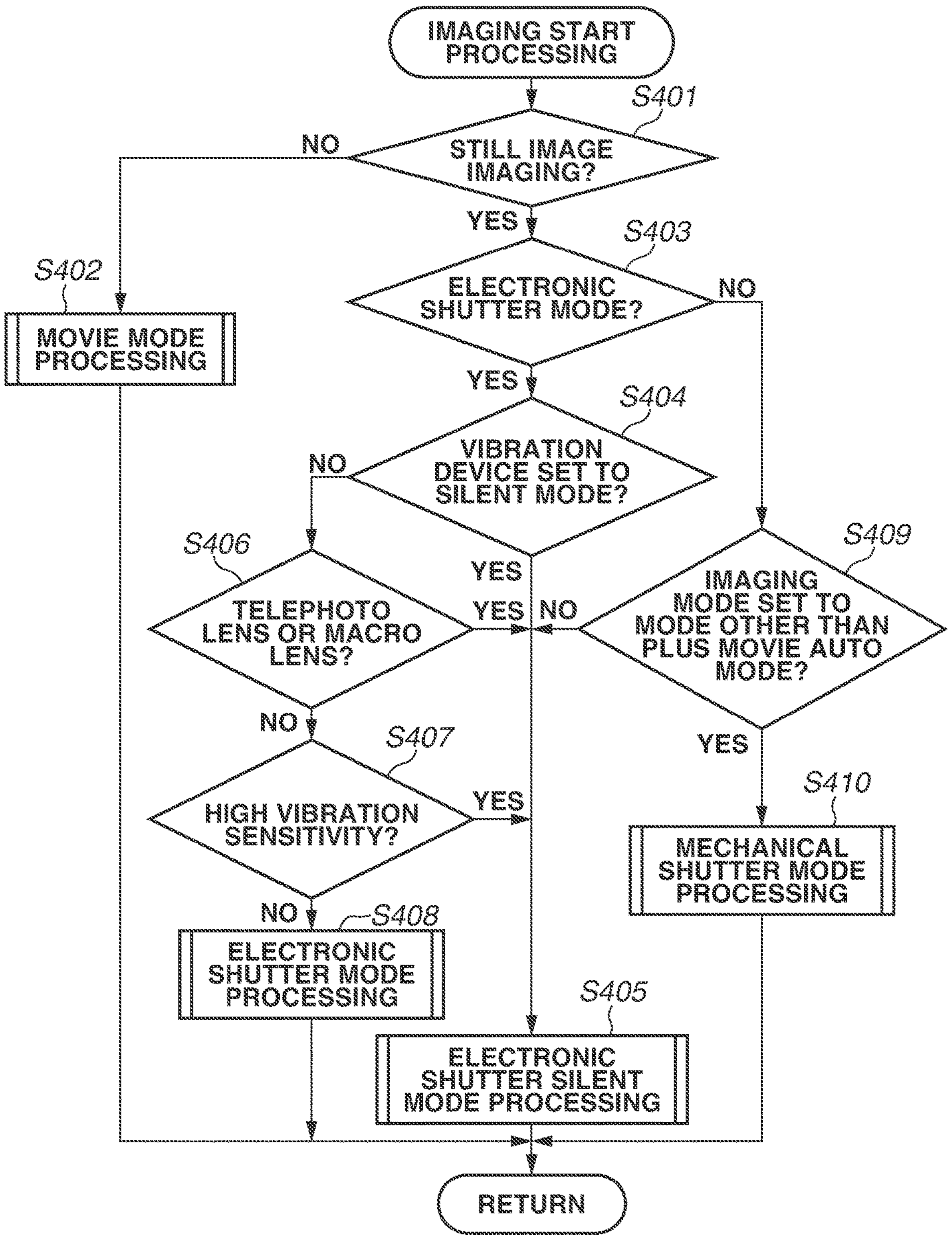
FIG. 11 is a flowchart illustrating a part of the main operation by the camera according to the exemplary embodiment of the present disclosure.
Figure 12:
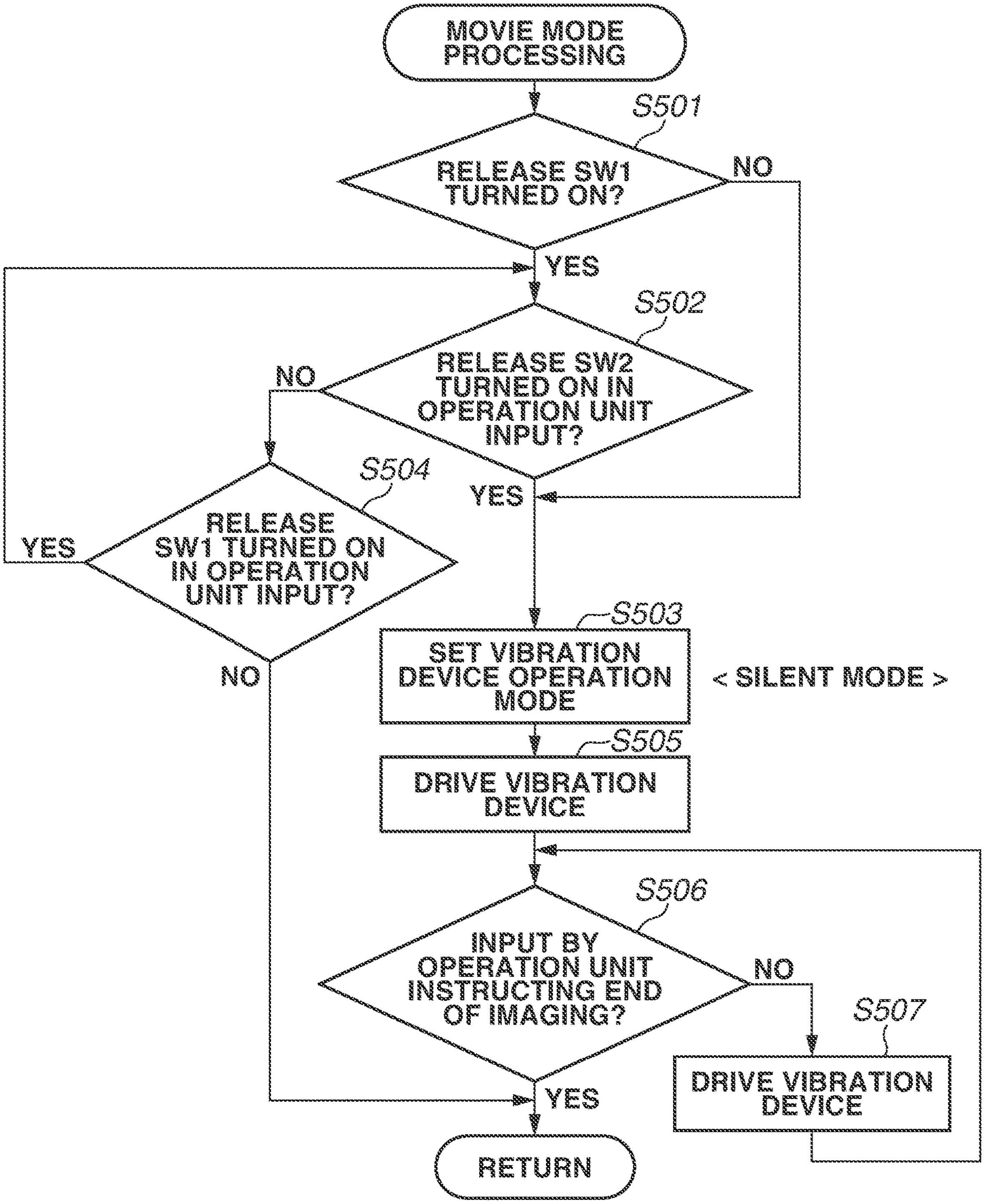
FIG. 12 is a flowchart illustrating a part of the main operation of the camera according to the exemplary embodiment of the present disclosure.
Figure 13:
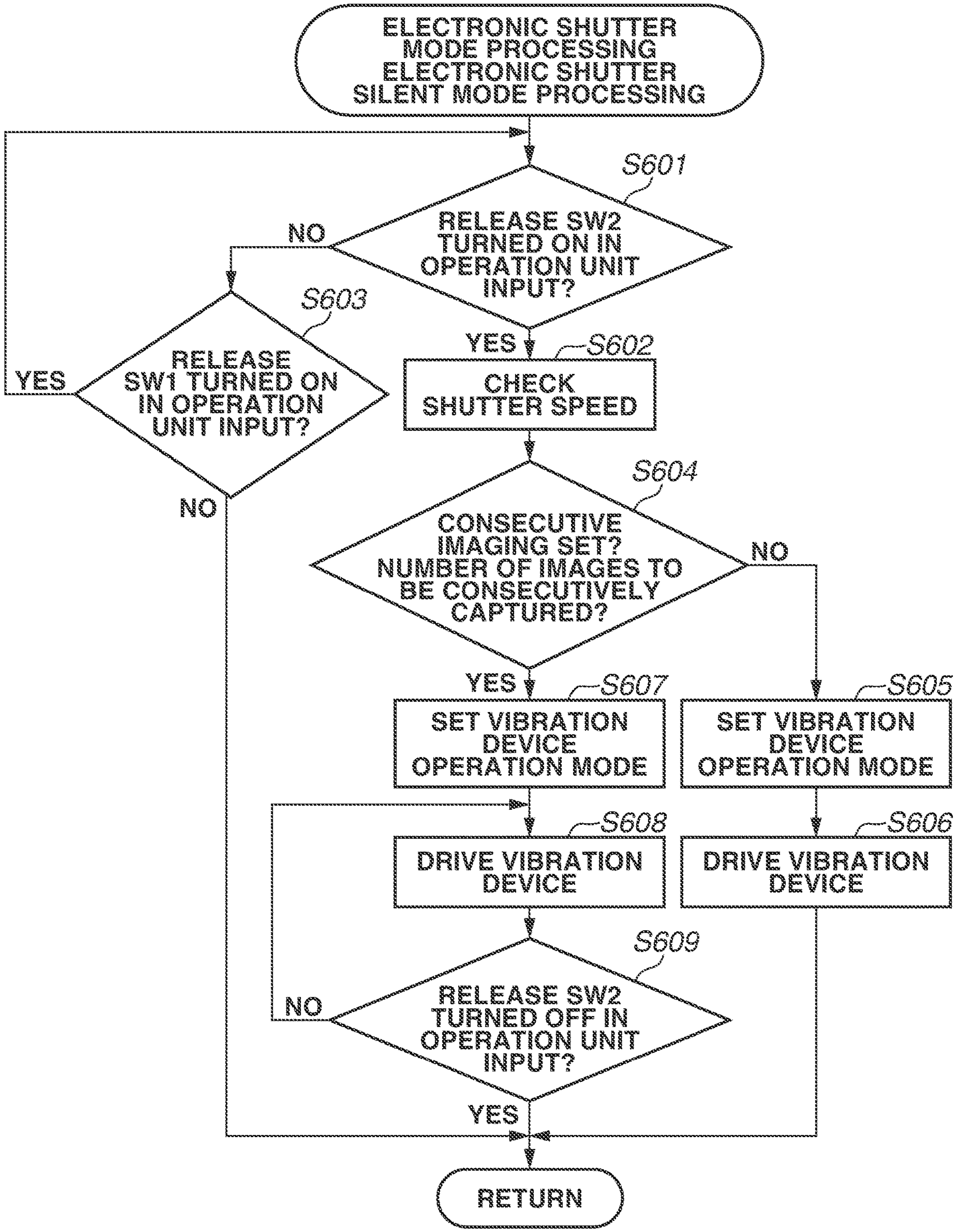
FIG. 13 is a flowchart illustrating a part of the main operation of the camera according to the exemplary embodiment of the present disclosure.
Figure 14:
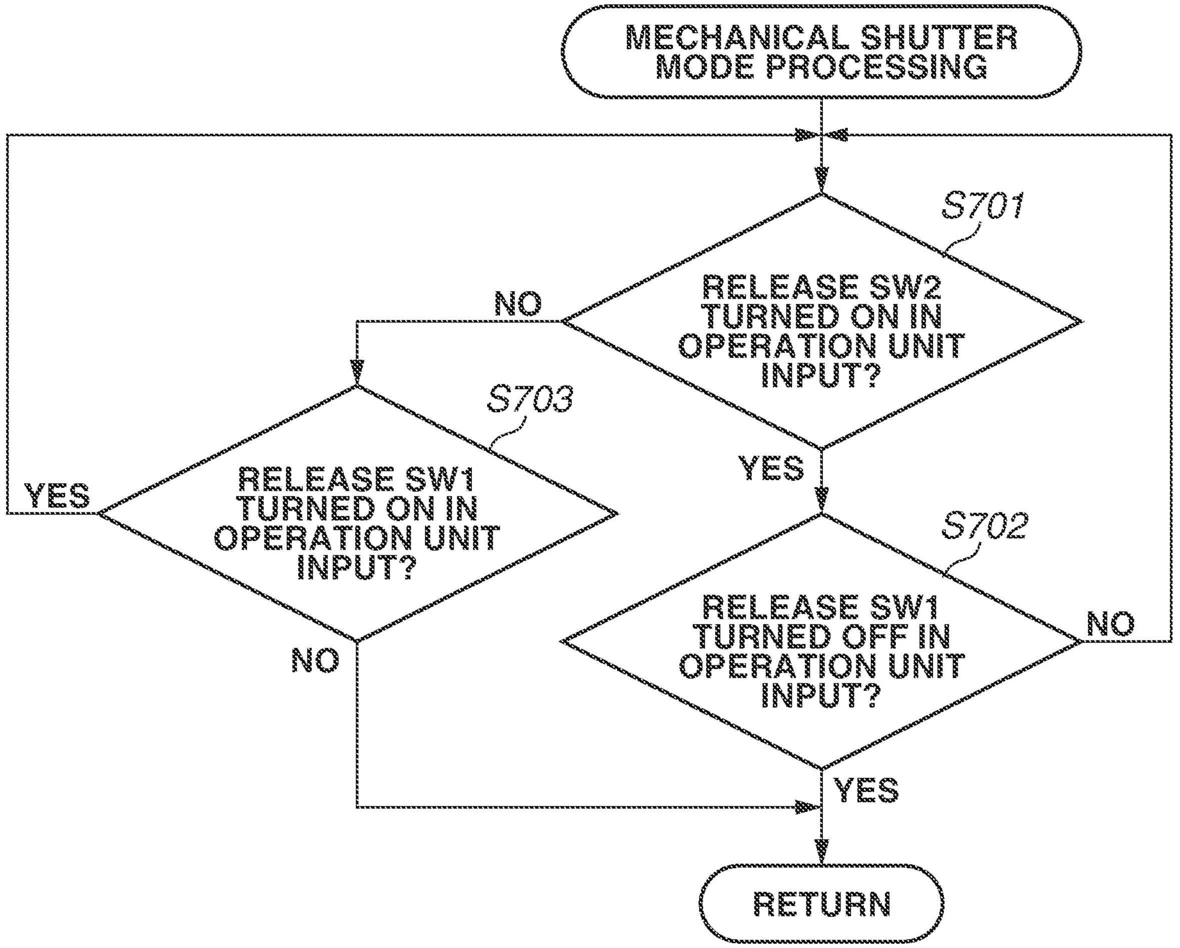
FIG. 14 is a flowchart illustrating a part of the main operation of the camera according to the exemplary embodiment of the present disclosure.

Next, the processing in each of the operation modes of the vibration device 109 in FIG. 11 is described with reference to flowcharts of FIG. 12 to FIG. 14.

<Movie Mode Processing>

The movie mode processing is described with reference to the flowchart of FIG. 12.

First, in step S501, in a case where the release button 106 has been pressed and the release SW1 has been turned on (YES in step S501), the processing proceeds to step S502.

In a case where the movie button 1102 has been pressed and the movie SW has been turned on (NO in step S501), the processing proceeds to step S503. In step S502, the system control unit 115 monitors input from the operation unit. In a case where the release SW2 has been turned on (YES in step S502), the processing proceeds to step S503. In step S503, the operation mode of the vibration device 109 is set to the silent mode.

On the other hand, in a case where the release SW2 off state is continued for a predetermined time (NO in step S502), the processing proceeds to step S504. In step S504, the state of the release SW1 is monitored.

In a case where the release SW1 is on (YES in step S504), the processing returns to step S502. In a case where the release SW1 has been turned off (NO in step S504), the routine of the movie mode processing ends.

In step S505, the system control unit 115 issues instruction to operate the vibration device 109 based on the set operation mode of the vibration device 109.

In step S506, the system control unit 115 continuously monitors the input from the operation unit. In a case where the input from the operation unit is not instruction to end the imaging (NO in step S506), the processing proceeds to step S507. In step S507, the system control unit 115 issues instruction to operate the vibration device 109 in the silent mode. Then, the processing returns to step S506.

In a case where the input from the operation unit is an instruction to end the imaging in step S506 (YES in step S506), the routine of the movie mode processing ends.

As described above, during the movie imaging, the vibration device 109 constantly operates in the silent mode, which makes it possible to give the operation-feeling of operating the operation unit to the user while reducing the driving noise of the vibration device 109.

<Processing in Electronic Shutter Mode and Electronic Shutter Silent Mode>

The processing in electronic shutter mode and processing in the electronic shutter silent mode are described with reference to the flowchart of FIG. 13.

The processing in the electronic shutter mode and the processing in the electronic shutter silent mode are different only in the set values of the operation mode (vibration mode) of the vibration device 109 in steps S605 and S607 described below.

First, in step S601, the system control unit 115 monitors the state of the release SW2. In a case where the release SW2 has been turned on (YES in step S601), the processing proceeds to step S602.

In a case where the release SW2 has not been turned on (NO in step S601), the processing proceeds to step S603. In step S603, the system control unit 115 monitors the state of the release SW1.

In a case where the release SW1 has been turned on in step S603 (YES in step S603), the processing returns to step S601. In a case where the release SW1 has been turned off (NO in step S603), the routine of the electronic shutter mode processing ends.

Next, in step S602, the system control unit 115 checks the shutter speed to be used in the imaging. In step S604, the system control unit 115 checks the setting of the consecutive imaging.

In a case where the consecutive imaging has been set to off (i.e., single imaging) (NO in step S604), the processing proceeds to step S605. In step S605, the operation mode of the vibration device 109 is set to a single imaging mode of the electronic shutter.

In step S606, the system control unit 115 refers to the vibration pattern corresponding to the shutter speed based on the management table T1 illustrated in FIG. 7B, and issues instruction to the vibration device 109.

With this operation, even during the still image imaging with the electronic shutter, the vibration device 109 is driven, and the operation-feeling as if the mechanical shutter operates is given to the user.

On the other hand, in a case where the consecutive imaging has been set to on in step S604 (YES in step S604), the processing proceeds to step S607. In step S607, the operation mode (vibration mode) of the vibration device 109 is set to the consecutive imaging mode of the electronic shutter.

In step S608, the system control unit 115 refers to the vibration pattern corresponding to the shutter speed based on the management table T2 illustrated in FIG. 7B, and issues an instruction to the vibration device 109.

Thereafter, in step S609, the system control unit 115 continuously monitors the state of the release SW2.

In a case where the on state of the release SW2 is continued in step S609 (NO in step S609), the operation of the vibration device 109 in step S608 is continued, which makes it possible to give the imaging operation-feeling to the user during the consecutive imaging.

In a case where the release SW2 has been turned off in step S609 (YES in step S609), the routine of the electronic shutter mode processing ends.

At this time, in the case of the electronic shutter silent mode, the set values of the operation mode of the vibration device 109 in steps S605 and S607 described above is set to values for the electronic shutter silent mode.

<Processing in Mechanical Shutter Mode>

The processing in mechanical shutter mode is described with reference to the flowchart of FIG. 14.

First, in step S701, the system control unit 115 monitors the state of the release SW2. In a case where the release SW2 has been turned on (YES in step S701), the processing proceeds to step S702. In a case where the release SW2 has been turned off (NO in step S701), the processing proceeds to step S703. In step S703, the system control unit 115 monitors the state of the release SW1.

In a case where the release SW1 has been turned on in step S703 (YES in step S703), the processing returns to step S701. In a case where the release SW1 has been turned off (NO in step S703), the routine of the mechanical shutter mode processing ends.

Next, in step S702, the system control unit 115 monitors the state of the release SW1. In a case where the release SW1 has been turned on (NO in step S702), the processing returns to step S701. In a case where the release SW1 has been turned off (YES in step S702), the routine of the mechanical shutter mode processing ends.

As described above, in the mechanical shutter mode, it is possible to give the imaging operation-feeling to the user by vibration and sound by the mechanical shutter operation in the imaging. Thus, it is unnecessary to drive the vibration device 109.

The imaging apparatus according to the present exemplary embodiment includes the imaging start operation units 105, 106, and 110 configured to instruct exposure start and exposure end of imaging, and the vibration device 109 configured to vibrate the imaging apparatus to transfer touch sense (touch feeling) corresponding to user operation on the imaging start operation units, to the user.

The imaging apparatus according to the present exemplary embodiment further includes the vibration device driving unit (vibration control unit) 134 including the plurality of vibration patterns for controlling driving of the vibration device 109.

The vibration device driving unit 134 changes the vibration parameters for the vibration device 109 based on the imaging mode and the user operation on the imaging start operation units 105, 106, and 110 during the imaging recording period.

The vibration parameters for the vibration device 109 include the vibration frequency, the amplitude, and the vibration duration.

The imaging apparatus according to the present exemplary embodiment further includes the front cover (exterior member) 201 with the vibration device 109 attached, the holding part 207 in contact with the vibration device 109, and the switch unit 205 configured to detect the operation of the release button 106 from a first position to a second position.

The vibration device 109 includes a first vibration mode for vibrating the imaging start operation unit in an imaging start state at the second position, and a second vibration mode for vibrating the exterior member at the first position.

The imaging start operation unit does not contact the vibration propagation member at the first position, and the imaging start operation unit contacts the vibration propagation member at the second position or before reaching the second position.

The imaging modes include the mechanical shutter mode and the electronic shutter mode.

The vibration device driving unit 134 sets driving of the vibration device 109 to off in the mechanical shutter mode, and sets the driving of the vibration device 109 to on in the electronic shutter mode.

The electronic shutter mode includes the silent mode of the vibration device 109 and a non-silent mode of the vibration device 109.

The vibration device driving unit 134 sets vibration of the vibration device 109 smaller in the silent mode, and sets the vibration of the vibration device 109 larger in the non-silent mode.

In a case where a shutter speed of the electronic shutter is higher, the vibration device driving unit 134 sets a vibration duration of the vibration device 109 shorter than a vibration duration of the vibration device 109 in a case where the shutter speed of the electronic shutter is lower.

In the case where the shutter speed of the electronic shutter is higher, the vibration device driving unit 134 may set an amplitude of the vibration device 109 smaller than an amplitude of the vibration device 109 in the case where the shutter speed of the electronic shutter is lower.

In a case where the number of consecutively captured images by the electronic shutter is larger, the vibration device driving unit 134 sets the vibration duration of the vibration device 109 shorter than the vibration duration of the vibration device 109 in a case where the number of consecutively captured images by the electronic shutter is smaller.

In the case where the number of consecutively captured images by the electronic shutter is larger, the vibration device driving unit 134 may set the amplitude of the vibration device 109 smaller than the amplitude of the vibration device 109 in the case where the number of consecutively captured images by the electronic shutter is smaller.

In a case where the number of captured images per one second is set greater than or equal to a predetermined threshold, the vibration device driving unit 134 sets the amplitude of the vibration device 109 smaller than the amplitude of the vibration device 109 in a case where the number of captured images per one second is set less than the predetermined threshold.

The vibration of the vibration device 109 when a focal length of an imaging optical system is long is smaller than the vibration of the vibration device 109 when the focal length of the imaging optical system is short.

As described above, it is possible to provide the imaging apparatus that can prevent, by appropriately controlling the vibration of the vibration device 109 based on the imaging setting, the driving of the vibration device 109 from generating noise, and can give the operation-feeling with no discomfort to the user. The exemplary embodiments described above are merely representative examples, and various modifications and alternations of each of the exemplary embodiments can be made in implementation of the present disclosure.

According to the exemplary embodiments of the present disclosure, the vibration pattern of the vibration device 109 is appropriately changed based on various imaging setting selected by the user.

Therefore, it is possible to provide the imaging apparatus that can perform the imaging under the quiet environment and can give the imaging operation-feeling without discomfort to the user.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-032453, filed Feb. 27, 2020, which is hereby incorporated by reference herein in its entirety.

What is claimed is:

1. An imaging apparatus having a plurality of switchable imaging modes, comprising:

an imaging start operation member configured to instruct exposure start of imaging;

a vibration device configured to vibrate the imaging apparatus to transfer a touch sense to a user corresponding to the user operation on the imaging start operation member;

a vibration control circuit including a plurality of vibration patterns for controlling driving of the vibration device, an exterior member attached to the vibration device;

a vibration propagation member in contact with the vibration device; and a detection member configured to detect an operation of the imaging start operation member from a first position to a second position, wherein the vibration control circuit changes at least one of a plurality of vibration parameters of the vibration device, including a vibration frequency, an amplitude, and a vibration duration time, based on the imaging mode and the user operation on the imaging start operation member, wherein the vibration device includes a first vibration mode of vibrating the imaging start operation member in an imaging start state at the second position, and a second vibration mode of vibrating the exterior member at the first position, and wherein the imaging start operation member does not contact the vibration propagation member at the first position, and the imaging start operation member contacts the vibration propagation member at the second position or before reaching the second position.

2. An imaging apparatus having a plurality of switchable imaging modes, comprising:

an imaging start operation member configured to instruct exposure start of imaging;

a vibration device configured to vibrate the imaging apparatus to transfer a touch sense to a user corresponding to the user operation on the imaging start operation member; and a vibration control circuit including a plurality of vibration patterns for controlling driving of the vibration device, wherein the vibration control circuit changes vibration parameters of the vibration device based on the imaging mode and the user operation on the imaging start operation member, wherein the imaging modes include a mechanical shutter mode and an electronic shutter mode, and wherein the vibration control circuit sets driving of the vibration device to OFF in the mechanical shutter mode, and sets the driving of the vibration device to ON in the electronic shutter mode.

3. The imaging apparatus according to claim 2, wherein the electronic shutter mode includes a silent mode of the vibration device and a non-silent mode of the vibration device, and wherein the vibration control circuit sets vibration of the vibration device smaller than or equal to a predetermined threshold in the silent mode, and sets the vibration of the vibration device larger than the predetermined threshold in the non-silent mode.

4. An imaging apparatus having a plurality of switchable imaging modes, comprising:

an imaging start operation member configured to instruct exposure start of imaging;

a vibration device configured to vibrate the imaging apparatus to transfer a touch sense to a user corresponding to the user operation on the imaging start operation member; and a vibration control circuit including a plurality of vibration patterns for controlling driving of the vibration device, wherein the vibration control circuit changes vibration parameters of the vibration device based on the imaging mode and the user operation on the imaging start operation member, wherein the imaging modes includes an electronic shutter mode, and wherein, in a case where a shutter speed of the electronic shutter is higher than or equal to a predetermined threshold, the vibration control circuit sets a vibration duration time of the vibration device shorter than a vibration duration time of the vibration device in a case where the shutter speed of the electronic shutter is less than the predetermined threshold.

5. An imaging apparatus having a plurality of switchable imaging modes, comprising:

an imaging start operation member configured to instruct exposure start of imaging;

a vibration device configured to vibrate the imaging apparatus to transfer a touch sense to a user corresponding to the user operation on the imaging start operation member; and a vibration control circuit including a plurality of vibration patterns for controlling driving of the vibration device, wherein the vibration control circuit changes vibration parameters of the vibration device based on the imaging mode and the user operation on the imaging start operation member, wherein the imaging modes include an electronic shutter mode, and wherein, in a case where a number of consecutively captured images by the electronic shutter is larger than or equal to a predetermined threshold, the vibration control circuit sets a vibration duration time of the vibration device shorter than a vibration duration time of the vibration device in a case where a number of consecutively captured images by the electronic shutter is less than the predetermined threshold.

6. An imaging apparatus having a plurality of switchable imaging modes, comprising:

an imaging start operation member configured to instruct exposure start of imaging;

a vibration device configured to vibrate the imaging apparatus to transfer a touch sense to a user corresponding to the user operation on the imaging start operation member; and a vibration control circuit including a plurality of vibration patterns for controlling driving of the vibration device, wherein the vibration control circuit changes vibration parameters of the vibration device based on the imaging mode and the user operation on the imaging start operation unit, wherein the imaging modes include an electronic shutter mode, and wherein, in a case where a number of captured images per one second is set greater than or equal to a predetermined threshold, the vibration control circuit sets an amplitude of the vibration device smaller than an amplitude of the vibration device in a case where a number of captured images per one second is set less than the predetermined threshold.

7. An imaging apparatus having a plurality of switchable imaging modes, comprising:

an imaging start operation member configured to instruct exposure start of imaging;

a vibration device configured to vibrate the imaging apparatus to transfer a touch sense to a user corresponding to the user operation on the imaging start operation member; and a vibration control circuit including a plurality of vibration patterns for controlling driving of the vibration device, wherein the vibration control circuit changes vibration parameters of the vibration device based on the imaging mode and the user operation on the imaging start operation member, wherein vibration of the vibration device when a focal length of an imaging optical system is longer than or equal to a predetermined threshold is smaller than vibration of the vibration device when the focal length of the imaging optical system is shorter than the predetermined threshold.

* * * * *